United States Patent
Khoo et al.

(10) Patent No.: US 9,267,021 B2
(45) Date of Patent: Feb. 23, 2016

(54) ELASTOMER RUBBER AND ELASTOMER PRODUCT THAT DO NOT USE VULCANIZATION ACCELERATOR OR SULFUR

(75) Inventors: Siong Hui Khoo, Kuantan (MY); Lawrence Siau Tian Lim, Klang (MY); Seek Ping Lee, Petaling Jaya (MY); Eng Long Ong, Petaling Jaya (MY); Norihide Enomoto, Tokyo (JP)

(73) Assignees: KOSSAN SDN BHD, Klang (MY); MIDORI ANZEN CO., LTD, Tokyo (JP)

( * ) Notice: Subject to any disclaimer, the term of this patent is extended or adjusted under 35 U.S.C. 154(b) by 388 days.

(21) Appl. No.: 13/877,066

(22) PCT Filed: Sep. 30, 2011

(86) PCT No.: PCT/JP2011/073271
§ 371 (c)(1),
(2), (4) Date: Mar. 29, 2013

(87) PCT Pub. No.: WO2012/043894
PCT Pub. Date: Apr. 5, 2012

(65) Prior Publication Data
US 2013/0198933 A1 Aug. 8, 2013

(30) Foreign Application Priority Data
Sep. 30, 2010 (JP) .................................. 2010-221262

(51) Int. Cl.
*A41D 19/00* (2006.01)
*C08L 9/02* (2006.01)
(Continued)

(52) U.S. Cl.
CPC .............. *C08L 9/02* (2013.01); *A41D 19/0055* (2013.01); *C08K 3/22* (2013.01); *C08L 9/00* (2013.01); *C08K 5/095* (2013.01)

(58) Field of Classification Search
CPC ..... C08L 9/02; A41D 19/0055; A41D 19/0058
USPC .............................. 2/168; 524/565, 508, 161
See application file for complete search history.

(56) References Cited

U.S. PATENT DOCUMENTS 5,910,533 A 6/1999 Ghosal et al.
6,673,871 B2 1/2004 Warneke et al.
(Continued)

FOREIGN PATENT DOCUMENTS

JP 2001-527092 A 12/2001
JP 2004-526063 A 8/2004
(Continued)

OTHER PUBLICATIONS

International Search Report for PCT/JP2011/073271 Nov. 8, 2011.
(Continued)

*Primary Examiner* — Ling Choi
*Assistant Examiner* — Ronald Grinsted
(74) *Attorney, Agent, or Firm* — Pearne & Gordon LLP

(57) ABSTRACT

An elastomer composition comprising, an emulsion which comprises 25-30 weight % of acrylonitrile, 62-71 weight % of butadiene and 4-8 weight % of unsaturated carboxylic acid (total 100 weight %), wherein crosslink is formed by a bond through at least a part of substituent which is possessed by said unsaturated carboxylic acid, and residual substituent of at least one part of substituent which is possessed by said unsaturated carboxylic acid is left in state of free, further Mooney viscosity ($ML_{(1+4)}(100°\ C.)$) of the crosslinked product is 100-220, wherein thin film gloves composed of said elastomer does not contain sulfur which is a crosslinking agent and sulfur composition which is a vulcanization accelerator, thickness is 0.05-0.15 mm, gloves swelling ratio at gloves formation is 240-320, tensile stress is 22-35 MPa, elongation to break is 480-620% and tensile stress at 500% elongation is 15-35 MPa.

16 Claims, 14 Drawing Sheets

Figure 1:
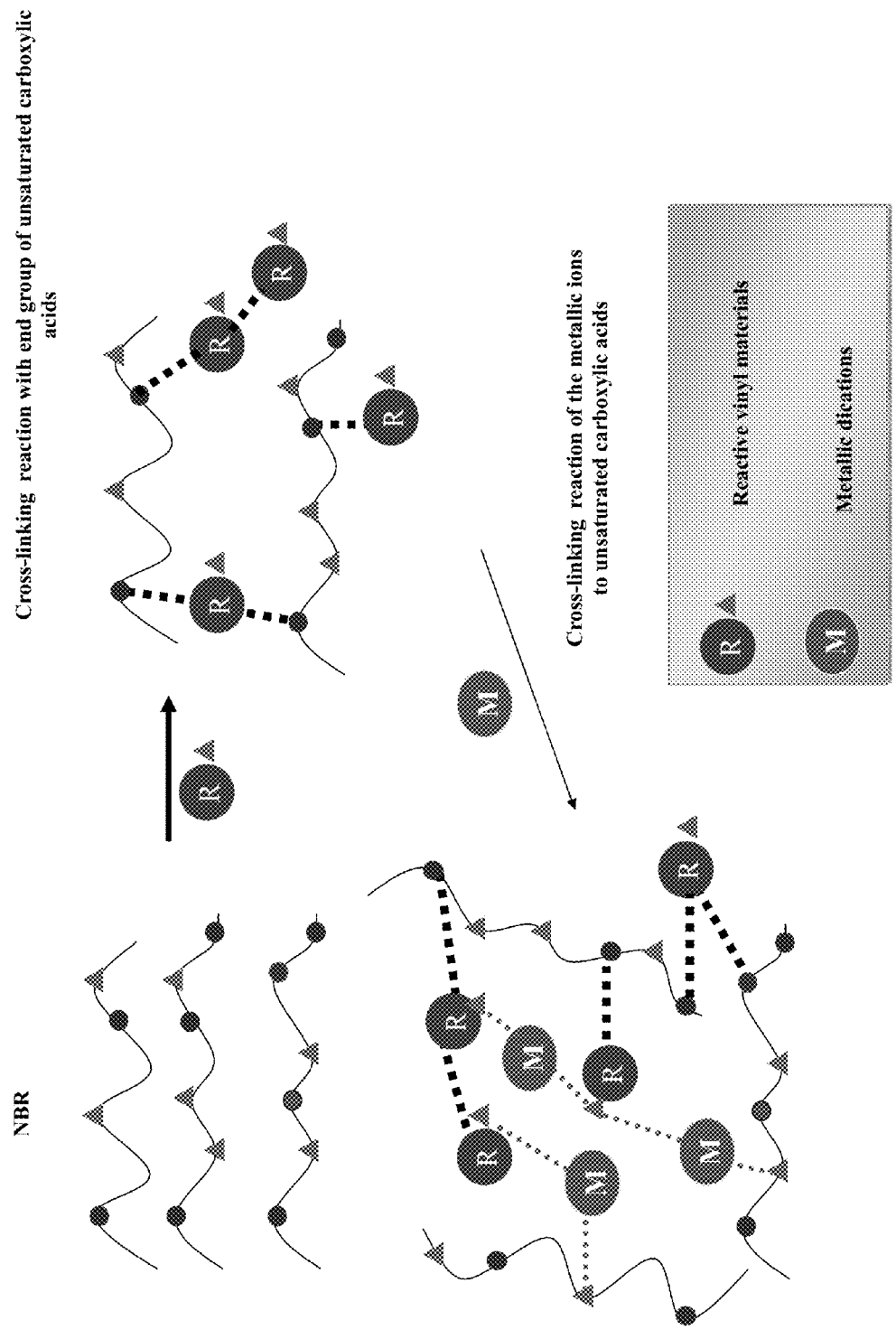

(51) Int. Cl.
*C08L 9/00* (2006.01)
*C08K 3/22* (2006.01)
*C08K 5/095* (2006.01)

(56) References Cited

U.S. PATENT DOCUMENTS

| | | |
|---|---|---|
| 2006/0253956 A1 | 11/2006 | Lipinski |
| 2006/0257674 A1 * | 11/2006 | Lipinski ............ A41D 19/0058 428/451 |
| 2012/0246799 A1 | 10/2012 | Khoo et al. |
| 2013/0191964 A1 | 8/2013 | Khoo et al. |

FOREIGN PATENT DOCUMENTS

| | | |
|---|---|---|
| JP | 2007-153948 A | 6/2007 |
| JP | 2008-545814 A | 12/2008 |
| WO | WO 2011068394 A1 * | 6/2011 |
| WO | 2012043893 A1 | 4/2012 |

OTHER PUBLICATIONS

Claims filed in U.S. Appl. No. 13/513,242 on Jul. 14, 2015 in the response to the Office action of Mar. 26, 2015 for that application.
Claims filed in U.S. Appl. No. 13/877,054 on Jul. 14, 2015 in the response to the Office action of Jan. 15, 2015 for that application.

* cited by examiner

Cross-linking reaction of unsaturated carboxylic acids and metallic ions
<This invention>

Conventional cross-linking reaction of surfur and metallic ions

<Electrical feature : Electric resistivity in wearing>

<Electrical feature: Static decay measurement>

ELASTOMER RUBBER AND ELASTOMER PRODUCT THAT DO NOT USE VULCANIZATION ACCELERATOR OR SULFUR

FIELD OF THE INVENTION

The present invention relates to a rubber gloves of thin film obtained by a method comprising, forming acrylonitrile-butadiene unsaturated carboxylic acid by adding unsaturated carboxylic acid to acrylonitrile-butadiene to which unsaturated carboxylic acid is added or not added, then adding zinc oxide so as to form crosslink by an end group of unsaturated carboxylic acid, unsaturated carboxylic acid and zinc oxide, sticking a composition containing said compound over surface of a mold or a former and harden the compound by crosslinking.

BACKGROUND OF ART

For the preparation of a latex product such as medical use gloves made of rubber, natural rubber latex has been used for long time as the starting material. The medical use gloves made of natural rubber latex has excellent elasticity and has been known to be a barrier to obstruct the moving of a pathogen contained in blood.

In a preparation method of a natural rubber gloves, it is generally performed to add sulfur as a vulcanizing agent or a vulcanization accelerator. Specifically, a mold or a former having shape of hand is dipped into natural rubber mixture to which a vulcanizing agent and an accelerator for one time or several times and a layer of desired thickness is laminated on the surface of the mold or the former. A rubber gloves of desired thickness is dried and crosslinked under heated temperature condition.

Crosslinking is a fundamental process to provide a natural rubber gloves with high elasticity. The natural rubber gloves prepared as above has excellent barrier ability, mechanical property and physical property.

Natural rubber latex contains less than 5% of non rubber components consisting of protein, lipid or other miner constituents. Along with increase of use of natural rubber latex gloves in hospital, users of I type hypersensitivity is increased. Cause of I type hypersensitivity caused by direct contact of a user to a natural rubber latex gloves is proved to be caused by latex protein existing in natural rubber which can be extractive. Hypersensitivity manifests immediately causes within 2 hours after contact with a gloves. This is caused by IgE (antibody in circulating blood) and allergic reaction is caused by IgE. The surface of skin displays uredo (hives) symptom which exceeds contacted point with latex.

Allergic symptom caused in whole body displays itching of eyes, turgid of lips and tongue, breathlessness, ache of abdomen, siccasia, extreme hypertonic state and unusually shock state by hypersensitivity.

And, the person who is progressing hypersensitivity symptom caused by natural rubber latex protein will be advised not to contact further with natural rubber latex and products made of natural rubber latex.

Since said protein is not contained in nitrile latex obtained by synthesis, carboxylated nitrile latex, synthesized latex such as poly chloroprene latex or polybutadiene latex, these latex does not cause said allergy. To the person who is progressed protein allergy, use of a gloves made of synthesized latex which uses nitrile latex, poly chloroprene latex or polybutadiene latex is recommended.

When a gloves made of these synthetic rubber latex is compared with a gloves made of natural rubber latex, from the viewpoint of physical property, the gloves of synthetic rubber latex is same or better than the gloves made of natural rubber latex, however, from the viewpoint of barrier property the former is inferior to the latter.

As the method for preparation of a medical use gloves from synthetic rubber, the same method as to natural rubber is used.

By same process to prepare a gloves using natural rubber, the thin film gloves of desired thickness can be obtained by sticking a composition of synthetic rubber elastomer on a mold or a former having shape of hand, then drying and crosslinking the composition. A gloves made of synthetic elastomer obtained as above can possesses desired mechanical property and physical property. Many gloves using synthetic rubber are developed and sold in the market. And as a starting material to prepare synthetic rubber gloves, carboxylized nitrile rubber is most commonly used.

In the method to prepare a gloves from synthetic rubber latex, sulfur is used as a crosslinking agent and sulfur containing compound is used as a crosslinking accelerator. Specifically, dithiocarbamate, tetramethyltiuram-disulfide (TMTD) or mercaptobenzothiazole (MBT) can be mentioned. These sulfur containing compounds can accelerate vulcanization. In a case of not using a vulcanization accelerator, vulcanization reaction is carried out by only use of sulfur. In this case, several hours treatment at high temperature condition of 140° C. is necessary, and the reaction progresses slowly.

At the preparation process of a rubber gloves, a vulcanization accelerator is used and consequently problems regarding health are caused. Concretely, these vulcanization accelerators make manifest contact determatitis delayed IVtype hypersensitivity which is allergic symptom. Delayed IVtype hypersensitivity causes after 24-72 hours from contact with a gloves. Generally, the symptom can be observed on the surface of hand or arm and causes dotted eruption, flare of skin and sometimes chaps of skin or bulla.

A gloves of nitrile rubber latex can be used instead of a gloves of natural rubber latex. In nitrile rubber latex, excess amount of vulcanization accelerator exists as residue. By stopping the use of a gloves of natural rubber latex, I type hypersensitivity can be avoided, however, delayed IVtype hypersensitivity by use of a gloves of nitrile rubber latex will be caused.

Accordingly, accomplishing of a method for preparation of a synthetic rubber gloves by excluding use of a sulfur crosslinking agent and a vulcanization accelerator becomes a pressing need. In a case to crosslink carboxylic nitrile rubber latex by not using sulfur crosslinking agent and a vulcanization accelerator of sulfur containing compound, it becomes necessary to crosslink a latex by a crosslinking agent not containing sulfur. As a non sulfur method, a crosslinking method by ionic bond using bivalent or trivalent metal zinc is now investigated. When this method is compared with sulfur method, formation of bonds is considered as to be same, however, from the viewpoint of physical property such as intensity and elongation, desired effect cannot be obtained and this is recognized as a problem. In the present invention use of bivalent metal salt such as zinc oxide is the essential point.

U.S. Pat. No. 5,014,362 (Patent Document 1) discloses a crosslinking method of carboxylic nitrile rubber using zinc oxide and sulfur. Typical carboxylic nitrile rubber is formed by segment consisting of acrylonitrile, butadiene and organic acid formed by various mixing ratio. By use of sulfur and a vulcanization accelerator, it becomes possible to form crosslinking by covalent bond in sub segment of butadiene. Further, in a part of carboxylated acrylonitrile (organic acid) ionic bond can be formed by using metal oxide such as zinc oxide or other metal salts. Ionic crosslinking is carried out by zinc ion and use crosslinking by sulfur too. When compared with a film by ionic crosslinking using zinc ion, physical property such as tension, braking intensity and abrasion resistance can be improved, however, problem caused by use of sulfur is not dissolved.

As mentioned above, in a case when mechanism of crosslinking is simply depending on ionic bond, rubber product becomes not reliable one in resistance to oil and chemicals.

In carboxylic nitrile rubber product such as gloves, to obtain effective crosslinking by combining covalent bond by sulfur and vulcanization accelerator with ionic crosslinking treatment by metal oxide such as zinc oxide and metal salt is an ordinary common sense.

Crosslinking method using said vulcanization accelerator results to cause new problem about health referring delayed IVtype hypersensitivity.

Since polymerization reaction is accelerated by using organized oxide, it becomes well known that intensity of rubber can be improved by adding organic zinc dimethacrylate and/or alkaline zinc methacrylate to rubber.

Polybuthadiene and methacrylic acid are mixed, then zinc oxide is added and a composition which is excellent in abrasion resistance can be obtained (Patent Document 2 JP53-125139 publication, Patent Document 3 JP52-121653 publication). By adding non polymerizing carboxylic acid to mixture of diene rubber, methacrylic acid, zinc oxide and organic peroxide, synthetic polymer having better tensile strength than natural latex (Patent Document 4 JP53-85842 publication). NBR crossliking becomes possible by using methacrylic acid, zinc oxide and peroxide, even if ionic bond is not existing.

Patent Document 5 (JPH08-19264 publication), discloses vulcanized rubber composition prepared by blending (b) 10-60 weight % of zinc compound whose content of coarser particles over than 20 μm is less than 5%, (c) 20-60 weight % of methacrylic acid and (d) 0.2-10 weight % organic peroxide to (a) 100 weight % of ethylene unsaturated nitrile—copolymerized conjugate diene rubber. Vulcanized rubber product which is excellent in intensity property can be obtained, and is useful for preparation of hoses, rolls and rubber vibration insulator, however, thin sheet such as gloves is not objected.

Soft nitrile rubber product which is rubber composition of high rigidity obtained by crosslinking under presence of sulfur hardening accelerator or non oxidated zinc (not containing bivalent zinc), having good tension and resistance against drug and characterized more soft than conventional products (Patent Document 6: Japan Patent 3517246 publication). In this document, tetramethyltiuramdisulfide combined with mercaptobenzothiazol (MBT) is used as a vulcanization accelerator. In soft nitrile rubber which is a reacted product consequently contains rubber.

Carboxylic nitrile rubber which is a copolymer of acrylonitrile, butadiene and unsaturated carboxylic acid can form ionic bond under presence of zinc and carboxyl group. However, it is difficult to form covalent bond by compound containing zinc, accordingly, the point to make up the defect by crosslinking with zinc using small amount of sulfur becomes very important point. Concretely, in JP2002-527632 publication (Patent Document 7) a gloves prepared by crosslink carboxylic nitrile rubber which is copolymer of acrylonitrile, butadiene and unsaturated carboxylic acid with 1-3 phr sulfur and polyvalent metal oxide.

In U.S. Pat. No. 6,673,871 publication (Patent Document 8), regarding elastomeric product such as gloves, the method to use metal oxide such as zinc oxide as a crosslinking agent by not using crosslinking agent or a vulcanizing agent containing sulfur is disclosed. In corresponding Japanese Patent JP2004-526063 publication (Patent Document 8), the method to crosslink and harden synthesized polymer at the temperature less than 85° C., said synthetic polymer is crosslinked by not using an accelerator and using crosslinking agent basically composed of metal oxide and a crosslinking agent which carries out sulfur substitution. Concretely, copolymer solution, which is on the market by the trademark of BARRIERPRO BP2000 from Reichhoold Chemicals Inc., is crosslinked under presence of water of specific concentration and zinc oxide which is a crosslinking agent. Regarding said copolymer, it is not clear that the copolymer what kind of behavior will acts at crosslinking procedure, and details of crosslinking is not clear. Regarding crosslinking agent which performs sulfur substitution, said synthetic polymer is hardened by crosslinking at the temperature of less than 85° C., however, since this temperature is too law, it cannot be said that a product of adequate crosslinking is obtained. Although there is no specific explanation about crosslinking, it is considered that the reaction accompanies with difficulty.

JP2008-534754 publication (Patent Document 9) is an invention relating rubber dispersion, use of the rubber dispersion for the preparation of a latex foam, method for preparation of the latex foam and the latex foam obtained by rubber dispersion of the present invention. And the invention can be illustrated as follows. That is; a reinforced latex polymer particles containing structural unit of a) 51-90 weight % of base latex polymer and b) 10-49 weight % of aromatic vinyl monomer and conjugated diene monomer, said reinforced latex polymer particles is aqueous reinforced rubber dispersion containing particles having single glass transition point (Tg) from −25° C. to 28° C. measured by differential scanning colorimeter (DSC), weight % is based on total weight of polymer particles in rubber dispersion, said base latex polymer particles has lower Tg measured by DSC than that of the reinforced latex particles. And not aiming a latex foam. Said invention is aiming to avoid disadvantage of a latex foam referring to viscoelasticity, that is, elasticity of pressed foam and recovery speed, and not aiming materials of thin rubber of the present invention.

JP2008-545814 publication (Patent Document 10) is a method to prepare an elastomer product comprising, (a) step to prepare carboxylic nitrile butadiene blended rubber composition containing 0.25-1.5 parts of zinc oxide to 100 parts of dry rubber, alkali to bring a pH over than 8.5, stabilizer, acid and at least one accelerator selected from the group consisting of guanidine, ditiocarbamate or thiazole compounds when need is arisen, (b) step to dip a former into said carboxylic nitrile butadiene blended rubber composition and (c) step to crosslink said carboxylic nitrile butadiene blended rubber composition and to form a elestomer product.

In said invention the rubber composition is crosslinked by zinc oxide. For the purpose to provide a product with desired resistance to chemicals, combination of a vulcanizing accelerator is contained. Ditiocarbamate is used as a vulcanizing accelerator. For the purpose to improve resistance to chemicals, ditiocarbamate vulcanizing accelerator and mixture of diphenyl guanidine and zinc mercaptobenzothiazole are used and better effect can be obtained. This is resulting to use sulfur and a vulcanizing accelerator for crosslinking of rubber, and a gloves prepared by said preparation method has a problem to cause IVtype hypersensitivity.

In the specification of U.S. Pat. No. 7,005,478 publication (Patent Document 11) there is a disclosure as mentioned below. That is, at the preparation of a product consisting of elastomer, react elastmer possessing a carboxyl group with (a) carboxylic acid or derivatives thereof, (b) compound containing bivalent or trivalent metal and (c) amine or amino compound in (d) condition to contain a neutralizing agent which neutralize at least a part of carboxylic acid group in said base polymer. At the reaction, a vulcanizing accelerator, thiuram and carbamate are not used. As a base polymer, natural latex rubber, synthetic latex polymer (e.g. acrylonitrile), butadiene rubber such as synthetic butadiene rubber or carboxylic butadiene rubber are mentioned as an example, however MMA is not contained. Or, does not use carboxylated acrylonitrile. In this method, said (c) amine or amino compound is an essential component. Amine group or amino group reacts with carboxylic acid derivatives and forms complex with bivalent or trivalent metal. By using complex forming reaction, stabilization becomes difficult and as the result, it is pointed out that a stabilized product is difficult to obtain.

In JP2008-512526 publication (patent Document 12), a polymer latex, wherein soft phase contains structural unit originated to at least one monomer selected from the group consisting of conjugated diene; ethylene unsaturated mono carboxylic acid, ethylene unsaturated dicarboxylic acid and anhydride thereof, monoester and mono amide; (metha)acrylonitrile, styrene, substituted styrene,α-methylstyrene, C1-C10 ester of (metha) acrylic acid, amide of (metha)acrylic acid, N-methylolamide group and esters thereof and ethylene unsaturated compound containing ether derivatives independently. Polymer latex according to any one of previously mentioned item, wherein hard phase contains structural unit originated to at least one monomer selected from the group consisting of ethylene unsaturated mono carboxylic acid, ethylene unsaturated dicarboxylic acid and anhydride thereof, monoester and mono amide; N-methylolamide group and esters thereof and ethylene unsaturated compound containing ether derivatives, mixture thereof, (metha)acrylonitrile, styrene, substituted styrene,α-methylstyrene, C1-C10 ester of (metha)acrylic acid, amide of (metha)acrylic acid and mixture thereof independently. And, crosslinking by N-methylolamide group is mentioned.

JP2010-144163 publication (Patent Document 13) discloses crosslinking by vinyl group or epoxy group.

JP2009-523164 publication (Patent Document 14) discloses combination of crosslinking bond receptor functional group and crosslinking agent.

JP2009-525411 publication (Patent Document 15) discloses self crosslinking of polyvinyl alcohol.

International publication 2005-049725 (Patent Document 16) uses organic peroxide under specific condition.

USPA2006/0057320 publication (Patent Document 17) uses alkoxy alkyl melamine and zinc oxide for crosslinking.

USPA2004/0132886 publication (Patent Document 18) uses combination of zinc oxide and peroxide as a crosslinking agent.

USPA2003/0017286 publication (Patent Document 19) uses zinc oxide, carboxylic acid, amine or amino compound as a crosslinking agent.

In Non Patent Document 1 (Andrew Kells and Bob Grobes "Cross-linking in carboxylated nitrile rubber dipped film" LATEX 24-25, January 2006 Frankfurt, Germany) reports that a latex, whose tensile strength is improved, is obtained by using tetramethylthiuram (TMTD), 2,2'-dithio-bis(benzothiazole) (MBTS), N-cyclohexylbenzothiazole-sulfinicamide (CBS), zinc diethylthio carbamate (ZDEC) and necessary additives consisting of zinc oxide with small amount of sulfur. This report shows that carboxylic nitrile latex gloves having excellent durability cannot be obtained without use sulfur or a vulcanizing accelerator based on sulfur.

A method to prepare a gloves from self crosslinking material is investigated, while, action of self crosslinking method which is necessary for preparation of desired gloves is not technically explained in the report. It is understood that sufficient results are not obtained regarding technical explanation of self crosslinking latex.

In Non Patent Document 2 (Dr. SorenBuzs "Tailored synthetic dipping lattices: New approach for thin soft and strong gloves and for accelerator-free dipping" LATEX 23-24, January 2008, Madrid, Spain) following two crosslinking methods are disclosed. That is, direct crosslinking method of NBR latex by functional reactive group (R) instead of conventional sulfur crosslinking, and crosslinking method of NBR latex by ionic bond formed between carboxyl group of NBR latex by zinc oxide. And, the document reports that this method is promising as a future technique. Unfortunately, there is no specific explanation about functional group which acts in covalent bond. And is not succeeded to make clear the concrete method for forming.

In Nichias technical information (Vol 5, 2000, No. 321), combination of epoxidated natural rubber and carboxylic NBR is used for self crosslinking.

PRIOR TECHNICAL DOCUMENT

Patent Document

[Patent Document 1] U.S. Pat. No. 5,014,362 Publication
[Patent Document 2] JPA53-125139 publication,
[Patent Document 3] JPA52-121653 publication
[Patent Document 4] JPA52-121653 publication
[Patent Document 5] JP8-19264 publication
[Patent Document 6] JP3517246 publication, JPA2000-503292 publication
[Patent Document 7] JPA2002-121653 publication
[Patent Document 8] U.S. Pat. No. 6,673,871 specification, and JPA2004-526063 publication, JP2004-52606
[Patent Document 9] JPA2008-534754 publication
[Patent Document 10] JPA2008-545814 publication
[Patent Document 11] U.S. Pat. No. 7,005,478 specification
[Patent Document 12] JPA2008-512526 publication
[Patent Document 13] JPA2010-144163 publication
[Patent Document 14] JPA2002-532164 publication
[Patent Document 15] JPA2009-525411 publication
[Patent Document 16] International 2005-049725 publication
[Patent Document 17] USPA2006/0057320 publication
[Patent Document 18] USPA2004/0132886 publication
[Patent Document 19] USPA2003/0017286 publication Non Patent Document

[Non Patent Document 1] Andrew Kells and Bob Grobes "Cross-linking in carboxylated nitrile rubber dipped film" LATEX 24-25, January 2006 Frankfurt, Germany
[Non Patent Document 2] Dr. SorenBuzs "Tailored synthetic dipping lattices: New approach for thin soft and strong gloves and for accelerator-free dipping" LATEX 23-24, January 2008, Madrid, Spain
[Non Patent Document 3] Nichias technical information (Vol 5, 2000, No. 321)

BRIEF SUMMARY OF THE INVENTION

Object of the Invention

In a case to use zinc oxide, sulfur and sulfur containing vulcanization accelerator (can be said as sulfur containing crosslinking accelerator) to latex of butadiene, acrylonitrile and unsaturated carboxylic acid elastomer, instead of sulfur and sulfur containing vulcanization accelerator, that is, a part of sulfur is replaced by zinc oxide, a problem regarding intensity caused by only use of zinc oxide can be dissolved. In gloves for medical use obtained by crosslinking, small amount of sulfur containing vulcanization accelerator is contained. This gloves for medical use does not use natural rubber. Although I type hypersensitivity caused by natural rubber, which is generally recognized as a problem, can be protected, there is no sufficient countermeasure against delayed IVtype hypersensitivity. Therefore, currently, a gloves which can cope with these problems is desired.

As mentioned above, a method to crosslink by not using sulfur as a crosslinking agent has been investigated, and a method to use metal oxide mainly zinc oxide has been investigated. When zinc oxide is used as a crosslinking agent, it is generally said that crosslinked acrylonitrile, butadiene and unsaturated carboxylic eleastomer cannot obtain sufficient property from the view point of intensity.

Accordingly, since in a case to use zinc oxide as a crosslinking agent, obtained product is not sufficient from the view point of intensity, the combination use with other crosslinking agent and crosslinking accelerator becomes necessary. Even if amount of use is minute, in a case of together use of a crosslinking agent composed of sulfur or a sulfur containing crosslinking accelerator, delayed IVtype hypersensitivity maybe caused. Therefore, a crosslinking agent composed of sulfur or a sulfur containing crosslinking accelerator cannot be used. A crosslinking measure not to cause delayed IVtype hypersensitivity is required.

The first object of the present invention is to bond an end group of unsaturated carboxylic acid of acrylonitrile-butadiene and unsaturated carboxylic elastomer, and an end group of unsaturated carboxylic acid of other acrylonitrile-butadiene and unsaturated carboxylic elastomer so as to obtain an elastomer composition which forms crosslink having sufficient intensity.

The second object of the present invention is to bond an end group of unsaturated carboxylic acid of a free acrylonitrile-butadiene and unsaturated carboxylic elastomer and an end group of unsaturated carboxylic acid of other free acrylonitrile-butadiene and unsaturated carboxylic elastomer not by using sulfur which is crosslinking agent and sulfur compound which is vulcanization accelerator but by forming crosslink by ionic bond through bivalent metallic ion, separately from the crosslink of sufficient intensity obtained by above mentioned first object, namely, an elastomer composition obtained by bonding an end group of unsaturated carboxylic acid of acrylonitrile-butadiene and unsaturated carboxylic elastomer and an end group of unsaturated carboxylic acid of other acrylonitrile-butadiene and unsaturated carboxylic elastomer, and to provide with an elastomer composition having good dynamic viscoelasticity crosslinked by above mentioned two crosslinking means.

The third object of the present invention is to provide with a gloves using an elestomer composition having good dynamic viscoelasticity prepared through first step crosslink and second step crosslink obtained by above mentioned second object of the present invention without using sulfur which is crosslinking agent and sulfur compound which is vulcanization accelerator, said gloves is characterized not to cause delayed IVtype hypersensitivity and is thin, further, is excellent in tensile stress, breaking strength and elongation, and tensile stress at breaking.

BRIEF ILLUSTRATION OF THE INVENTION

The inventors of the present invention have found following solving means and accomplished present invention.

The first step crosslink can be accomplished by reacting an end group of unsaturated carboxylic acid added to acrylonitrile-butadiene unsaturated carboxylic acid obtained by adding unsaturated carboxylic acid to acrylonitrile-butadiene or acrylonitrile-butadiene unsaturated carboxylic acid with an end group of unsaturated carboxylic acid added to other acrylonitrile-butadiene unsaturated carboxylic acid obtained by adding carboxylic acid to acrylonitrile-butadiene or acrylonitrile-butadiene unsaturated carboxylic acid so as to bond end groups of unsaturated carboxylic acid (first step crosslink). Crosslink can be performed only by this bond, however, this bond cannot be said to dissolve all problems. An end group of unsaturated carboxylic acid added to acrylonitrile-butadiene unsaturated carboxylic acid becomes free state by residual acrylonitrile-butadiene unsaturated carboxylic acid which does not bond with an end group of unsaturated carboxylic acid added to other acrylonitrile-butadiene unsaturated carboxylic acid, and through the end group of free state an ionic bond can be formed by metallic salt (second step crosslink).

In the first step crosslink, an end group of said unsaturated carboxylic acid can use at least one bond selected from the group consisting of carboxylic group, methylolamide group, reacted product of carboxylic group and diamine and reacted product of carboxylic group and alkyl alcohol.

(1) An elastomer composition obtained by first step crosslink can be illustrated as follows.

An elastomer composition comprising, an emulsion which comprises 25-30 weight % of acrylonitrile, 62-71 weight % of butadiene and 4-8 weight % of unsaturated carboxylic acid (total 100 weight %) wherein, crosslink is formed by a bond through at least a part of substituent which is possessed by said unsaturated carboxylic acid, and residual substituent of at least one part of substituent which is possessed by said unsaturated carboxylic acid is left in state of free, further Mooney viscosity ($ML_{(1+4)}(100°$ C.)) of the crosslinked product is 100-220 and film weight swelling ratio of the crosslinked product is 200-400%.

Crossliking can be illustrated as follows.

Properties of the composition to which the first step crosslink is performed by forming a bond by reacting an end group of unsaturated carboxylic acid added to acrylonitrile-butadiene unsaturated carboxylic acid obtained by adding unsaturated carboxylic acid to acrylonitrile butadiene or acrylonitrile-butadiene unsaturated carboxylic acid with an end group of unsaturated carboxylic acid added to other acrylonitrile butadiene unsaturated carboxylic acid obtained by adding carboxylic acid to acrylonitrile-butadiene or acrylonitrile-butadiene unsaturated carboxylic acid are follows.

In acrylonitrile-butadiene carboxylic acid of the present invention, Mooney viscosity ($ML_{(1+4)}(100°$ C.)) is 100-220, namely comparatively in condition of high polymer, processing feature as gloves is good, regarding obtained gloves, thickness is adequate, having barrier property and has sufficient intensity and tensile strength. Further, film weight swelling ratio (heat treated at 40° C. and measured as a uniform film) is 200-400%. Since sulfur which is a crosslinking agent and sulfur compound which is a vulcanizing accelerator is not used, delayed IVtype hypersensitivity cannot be caused. In a case to use anionic surfactant as a dispersing agent, sulfur which is a crosslinking agent and sulfur compound which is a vulcanizing accelerator are not used, accordingly does not cause delayed IVtype hypersensitivity.

(2) An elastomer composition obtained by the second step crosslink can be explained as follows.

That is, said elastomer composition is an emulsion comprising 25-30 weight % of acrylonitrile, 62-71% of butadiene and 4-8 weight % of unsaturated carboxylic acid (total 100 weight %), in which covalent bond is formed by a bond trough at least one part of substituent possessed by said unsaturated carboxylic acid, further residual substituent of at least one part of substituent possessed by said unsaturated carboxylic acid is crosslinked by forming ionic bond through bivalent metallic ion and film weight swelling ratio of crosslinked product is 200-400%.

At the second step crosslink, not crosslinked part of said elastomer composition, to which first step crosslink is accomplished, is crosslinked by ionic bond.

Crosslinking reaction by ionic bond is carried out as follows. That is, 100 phr of elastomer composition to which the first step crosslinking reaction is performed, 0.5-4.0 phr of crosslinking agent consisting of bivalent metallic ion, 0.1-2.0 phr of pH adjusting agent to adjust pH to 9-10, 0.5-2.0 phr of dispersing agent and water are mixed. Said water is added by amount so as the concentration of total solid compound (TSC) to be 18-30 weight %, and treated.

By this treatment, second step crosslink through bivalent metallic ion is carried out on free state end group of unsaturated carboxylic acid added to acrylonitrile-butadiene unsaturated carboxylic acid, simultaneously on free state end group of unsaturated carboxylic acid added to acrylonitrile-butadiene unsaturated carboxylic acid using bivalent metallic ion, concretely zinc metallic ion Characteristics of crosslinked product obtained by second step crosslink is mentioned below.

At first step, sulfur and sulfur containing compound are not used as a crosslinking agent or a vulcanization accelerator. By the condition of not containing sulfur and sulfur containing compound, an end group of at least one part of unsaturated carboxylic acid added to acrylonitrile-butadiene unsaturated carboxylic acid and an end group of at least one part of unsaturated carboxylic acid added to other acrylonitrile-butadiene unsaturated carboxylic acid are bonded and crosslinked. An end group of residual unsaturated carboxylic acid except added to at least one part of acrylonitrile-butadiene carboxylic acid is not forming crosslink by bonding with an end group of unsaturated carboxylic acid added to at least one part of other acrylonitrile-butadiene carboxylic acid, but remains as an end group of free state. When the end group of free state is treated under above mentioned condition, it bonds with an end group of free state of unsaturated carboxylic acid added to at least one part of other acrylonitrile-butadiene carboxylic acid and performs crosslink.

Since this crosslink formation is progressed in state of emulsion, a dispersing agent is used. For the purpose to maintain good emulsion state, it becomes necessary to use a surfactant such as alkylbenzene sulfonate which is anionic surfactant. Said alkylbenzene sulfonate is not a crosslinking agent or a vulcanization accelerator but a dispersing agent, and this sulfur containing compound does not manifest contact dermatitis delayed IVtype hypersensitivity which is allergic symptom.

Behavior of dynamic viscoelasticity is investigated and following points are confirmed. Tg temperature of acrylonitrile-butadiene unsaturated carboxylic acid on which second step crosslink is performed is −10.1° C. In the meanwhile, Tg of 6322 which is other starting materials is 12.2° C., and that of Nipol 550 is −11.8° C. It is clearly understood that Tg of the acrylonitrile-butadiene unsaturated carboxylic acid on which second step crosslink is performed is higher than that of these compounds. Further, regarding the length of flat part of rubber state region, in a case of Nipol 550 which is considered not to be self crosslinked is very short, and in a case of the present invention, the length is not so short.

When dynamic viscoelasticity of the acrylonitrile-butadiene unsaturated carboxylic acid on which second step crosslink is performed is compared with that of conventionally sulfur crosslinked acrylonitrile-butadiene unsaturated carboxylic acid, it is clearly understood that crosslinking density of the acrylonitrile-butadiene unsaturated carboxylic acid on which second step crosslink by zinc is performed is increased, and elastic modulus is larger than that of sulfur crosslinked one. This result is considered to be depended on zinc which is bivalent metallic salt of the present invention.

Tg of the acrylonitrile-butadiene unsaturated carboxylic acid on which second step crosslink of the present invention is accomplished (from −11.0 to 1.5° C.) is higher than that of sulfur crosslinked rubber (from −14.5 to −15.9° C.). From this result, it is understood that along with increase of crosslinking density by zinc crosslink, elastic modulus decreases and sifts to higher temperature side, width of transition temperature extends, storage elastic modulus drops slowly and elastic modulus of flat part becomes higher.

As mentioned below, from the results of dynamic viscoelasticity, the product of the present invention can obtain following properties by performing crosslinks by above mentioned first step crosslink and second step crosslinking.

(A) Temperature showing maximum value of loss tangent indicated by tan δ (ratio of storage elastic modulus/loss elastic modulus) is corresponding to glass transition temperature (Tg) at the transition temperature region of rubber, from the temperature of freezing state to the temperature to start micro Brownian motion, and glass transition temperature becomes high when basic molecular motion is depressed (be hard to move), for example, rigid molecular chain or crosslinking density becomes large.

Tg of the acrylonitrile-butadiene unsaturated carboxylic acid (shortened to SXL) of the present invention is measured as −10.1° C. Glass transition temperature of 6322, which is a conventional product, is −12.2° C., and that of Nipol 550 is −11.6° C.

Regarding Tg, the acrylonitrile-butadiene unsaturated carboxylic acid (SXL) of the present invention indicates higher result compared with other products. Therefore, enmeshing state, probably crosslinking density by self crosslink, is considered to be high. Further, it is considered that Nipol 550 is extremely short.

(B) Storage elastic modulus of flat rubber state region which is high temperature region higher than glass transition temperature becomes high when crosslinking density by enmeshing becomes higher and molecular weight (Mc) between crossrinking chain becomes shorter. Length of flat part of rubber state region (temperature region) is known to indicate correlation with enmeshing number per one molecule.

Figure 9:
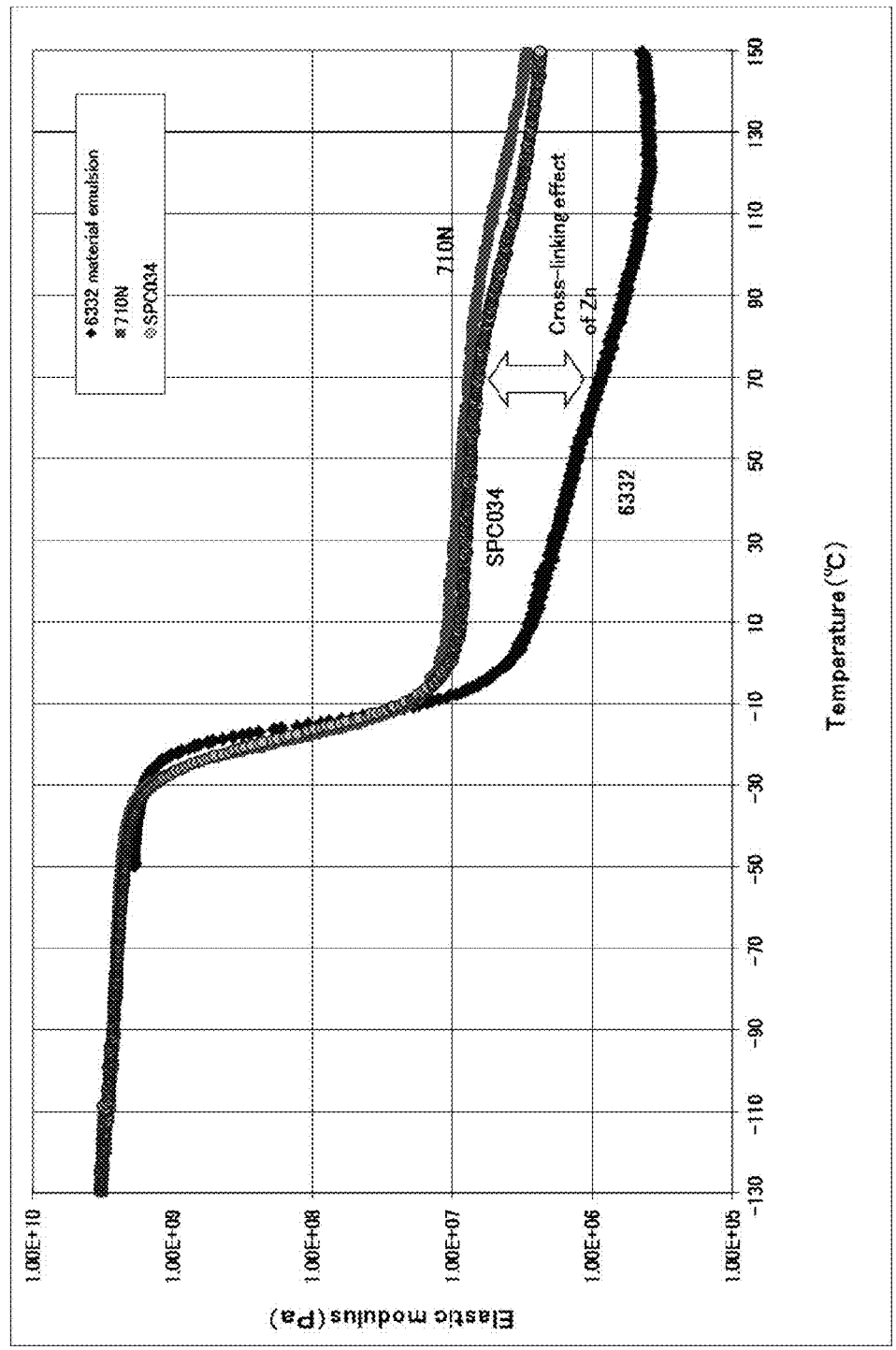

According to FIG. 9, increase of elastic modulus of acrylonitrile-butadiene unsaturated carboxylic acid gloves prepared by zinc adding vulcanization at flat part of rubber state region is larger than that of sulfur vulcanization product. That is, increase of elastic modulus by adding zinc is large, and it reflects improvement of crosslinking density by addition of zinc.

Figure 7:
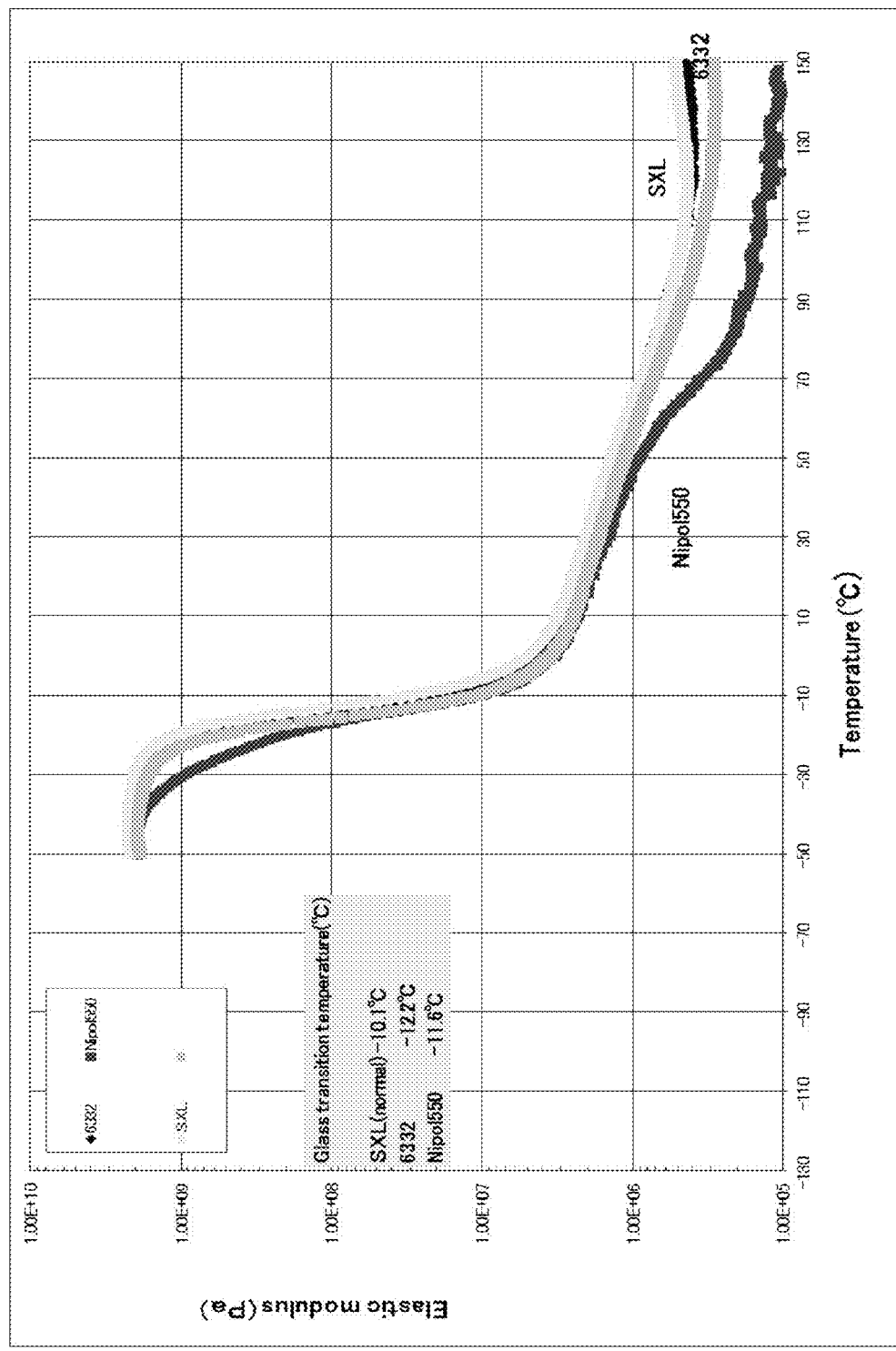

According to FIG. 7, Tg temperature of gloves made of acrylonitrile-butadiene unsaturated carboxylic acid (from −11.0 to 1.5° C.) is higher than that of sulfur vulcanized rubber (from −14.5 to −15.9° C.) and this tendency is caused by following phenomenon. That is, elastic modulus decreases and sifts to higher temperature side, width of transition temperature extends, storage elastic modulus drops slowly and elastic modulus of flat part becomes higher.

The elastomer emulsion of acrylonitrile-butadiene unsaturated carboxylic acid, to which first and second step of crosslink are accomplished, brings the result to obtain acrylonitrile-butadiene unsaturated carboxylic acid not containing sulfur, which is crosslinking agent, and sulfur compound, which is vulcanizing accelerator, and the fact that the property of the elustomer emulsion is excellent can be confirmed by above mentioned points. Using the acrylonitrile-butadiene unsaturated carboxylic acid elastomer emulsion composition to which first and second step of crosslink are accomplished, a glove having following property can be prepared.

(3) By sticking elastomer composition obtained through the first step crosslink and the second step crosslink, to the surface of a mold or a former, which is a conventional preparation measures of gloves, and hardening by crosslink, a gloves having following property is accomplished.

A gloves is formed from elastomer which comprises 25-30 weight % of acrylonitrile, 62-71 weight % of butadiene and 4-8 weight % of unsaturated carboxylic acid (total 100 weight %), wherein crosslink is formed by a bond through at least a part of substituent which is possessed by said unsaturated carboxylic acid, and residual substituent of at least one part of substituent which is possessed by said unsaturated carboxylic acid is crosslinked by bivalent metallic ion. Said elastomer, which is crosslinked by a bond through at least a part of substituent which is possessed by said unsaturated carboxylic acid, does not contain sulfur compound as a crosslinking agent and a vulcanizing accelerator and Mooney viscosity ($ML_{(1+4)}(100°$ C.)) of the crosslinked elastomer is 100-220. Thin film gloves prepared from said elastomer which does not contain sulfur compound as a crosslinking agent and a vulcanizing accelerator, having thickness of 0.05-0.15 mm, swelling ratio at glove preparation of from 240 to 320, tensile stress of 22-35 MPa, elongation at breaking of 480-620% and tensile stress at 500% elongation of 15-35 MPa can be obtained.

(4) A preparation process of a gloves having property obtained in said (3) process can be illustrated as follows. That is, the process is to crosslink and to harden the elastomer composition obtained by (3), and to intend to obtain a gloves.

Preparation processes can be explained as follows.

(a) process to wash a mold or a former by washing water and to dry.

(b) process to dip the mold or the former into solution of coagulant.

(c) process to dry the mold or the former to which coagulant is stuck.

(d) process to dip the mold or the former to which coagulant is stuck and dried into elastomer composition mentioned in (3) for 1-20 seconds under temperature condition of 30° C.

(e) process to dry the mold or the former obtained in (d) process at 80-120° C.

(f) process to crosslink and harden the mold or the former obtained in (e) process to which elastomer prepared by adding unsaturated carboxylic acid to acrylonitrile-butadiene elastomer mentioned in (3) by treatment at 120-150° C. for 20-30 minutes.

Effect of the Invention

By the present invention, following effects can be obtained.
(1) The elastomer composition on which first step crosslink is performed is a composition comprising of 25-30 weight % of acrylonitrile, 62-71 weight % of butadiene and 4-8 weight % of unsaturated carboxylic acid (total 100 weight %) and Mooney viscosity ($ML_{(1+4)}(100°$ C.)) is 100-220, and when film is formed, film weight swelling ratio of it is 200-400%.

The preparation can be explained as follows. By bonding an end group of unsaturated carboxylic acid added to acrylonitrile-butadiene obtained by adding unsaturated carboxylic acid to acrylonitrile-butadiene or acrylonitrile-butadiene carboxylic acid with an end group of unsaturated carboxylic acid added to acrylonitrile-butadiene obtained by adding carboxylic acid to other acrylonitrile-butadiene or acrylonitrile-butadiene carboxylic acid, thus the first step crosslinking can be performed.

(2) The elastomer composition on which second step crosslink is performed is a composition comprising 25-30 weight % of acrylonitrile, 62-71 weight % of butadiene and 4-8 weight % of unsaturated carboxylic acid (total 100 weight %), covalent bond is formed by at least one part of substituent possessed by said unsaturated carboxylic acid, and residual substituent of at least one part of substituent possessed by said unsaturated carboxylic acid is crosslinked by forming ionic bond through bivalent metallic ion, and crosslinked product is an emulsion of elastomer composition whose Mooney viscosity ($ML_{(1+4)}(100°$ C.)) is 100-300 and film weight swelling ratio is 200-400%.

In a case when an end group of unsaturated carboxylic acid added to acrylonitrile-butadiene carboxylic acid obtained by adding carboxylic acid to acrylonitrile-butadiene carboxylic acid does not exist, it forms a state that a bond is not formed and a state that the end group is a state of free. Concrete treatment condition is mentioned below. That is, 100 phr of said elastomer, 0.5-4.0 phr of crosslinking agent consisting of bivalent metallic ion, 0.1-2.0 phr of pH adjusting agent to adjust pH to 9-10, 0.5-2.0 phr of dispersing agent and water are mixed and treated. Said water is added by amount so as the concentration of total solid compound (TSC) to be 18-30 weight %. Thus ionic crosslink is performed by zinc ion which is bivalent metallic ion (second step crosslink).

By combining first step crosslink and second step crosslink, new crosslinked product of the present invention can be obtained. In the case of the product of the present invention, storage elastic modulus is measured. In the case of the present invention, Tg is high and crosslinking density is increased, and if crosslinked by zinc, zinc crosslinking density is increased and glass transition temperature becomes higher.

(3) Properties of gloves are follows.

A gloves formed from elastomer comprising 25-30 weight % of acrylonitrile, 62-71 weight % of butadiene and 4-8 weight % of unsaturated carboxylic acid (total 100 weight %), crosslinked by a bond of at least one part of substituent possessing said unsaturated carboxyl group, and residual substituent of at least one part of substituent possessed by unsaturated carboxylic acid is crosslinked bivalent metal, and not contain sulfur which is a crosslinking agent and sulfur composition which is a vulcanization accelerator, Mooney viscosity ($ML_{(1+4)}(100°$ C.)) of elastomer crosslinked by a bond of at least one part of substituent possessing said unsaturated carboxyl group is 100-220. Regarding properties of gloves composed of said elastomer, thin film gloves does not contain sulfur which is a crosslinking agent and sulfur composition which is a vulcanization accelerator, thickness is 0.05-0.15 mm, gloves swelling ratio at gloves formation is 240-320, tensile stress is 22-35 MPa elongation to break is 480-620% and tensile stress at 500% elongation is 15-35 MPa.

BRIEF ILLUSTRATION OF DRAWING

[FIG. 1] is a drawing showing a state to crosslink the materials composition of the present invention

Figure 2:
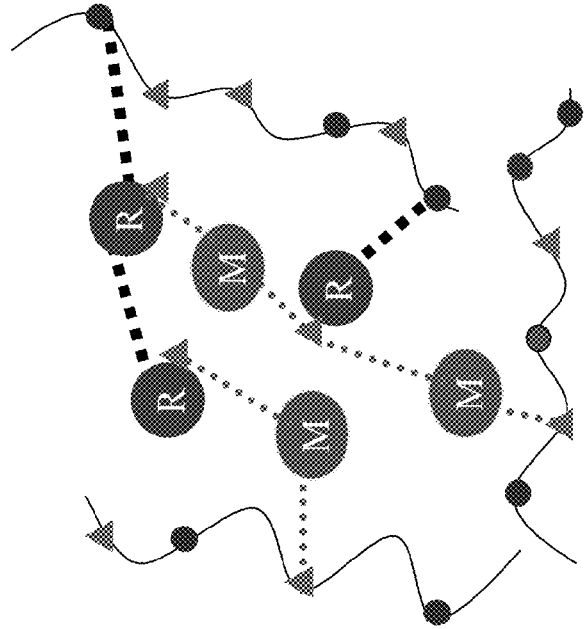
Figure 2:
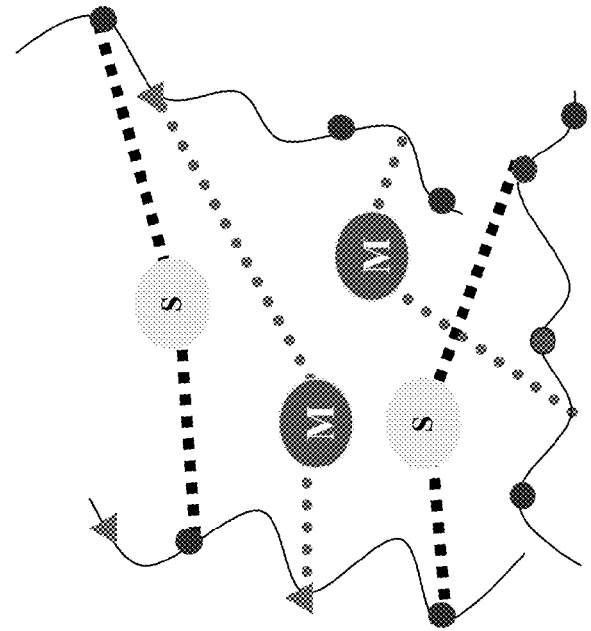

[FIG. 2] is a drawing illustrating crosslinking state of the present invention and conventional crosslinking state

Figure 3:
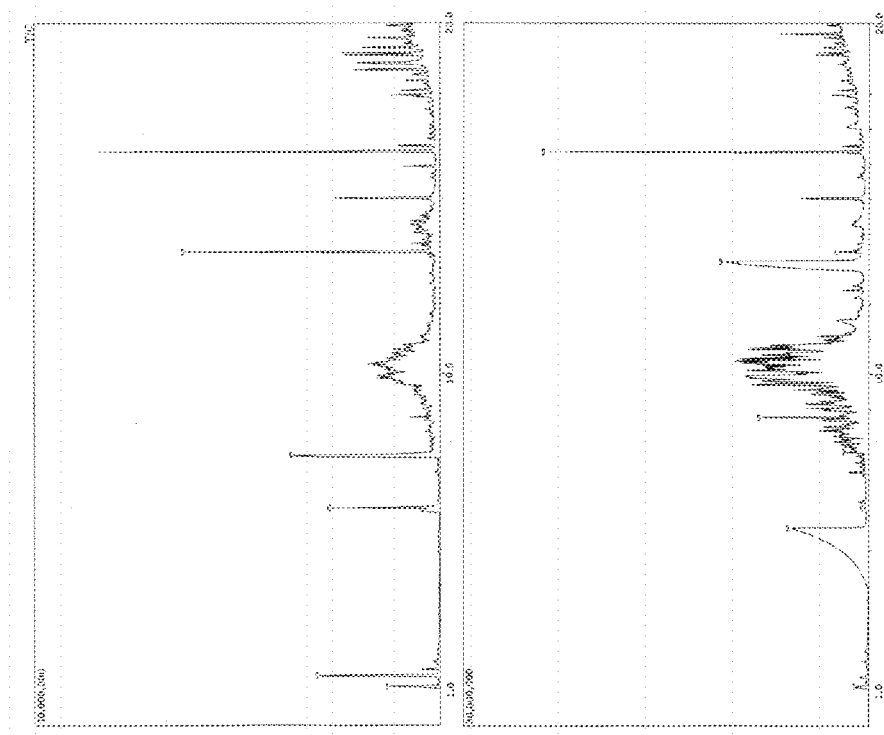

[FIG. 3] is a drawing to show the amount of volatile unreacted MMA monomer contained in the present invention and conventional product. Lower drawing of FIG. 3 (present invention) shows the amount of volatile unreacted MMA monomer of 746SXL. Upper drawing of FIG. 3 (conventional case) shows the amount of volatile unreacted MMA monomer.

Figure 4:
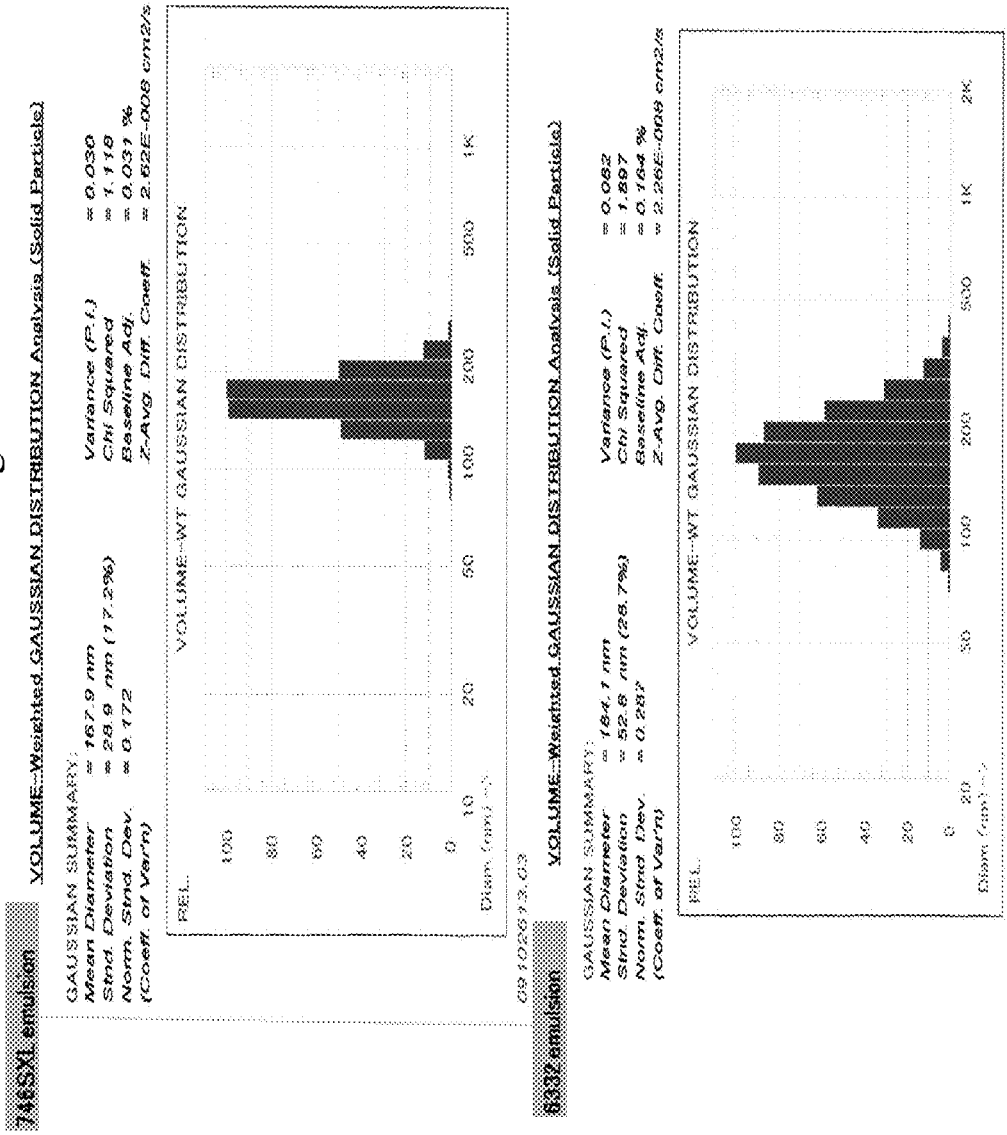

[FIG. 4] Upper drawing of FIG. 4 shows measurement result of latex particles of 746SXL of the present invention. Lower drawing of FIG. 4 shows measurement result of latex particles of conventional 6322.

Figure 5:
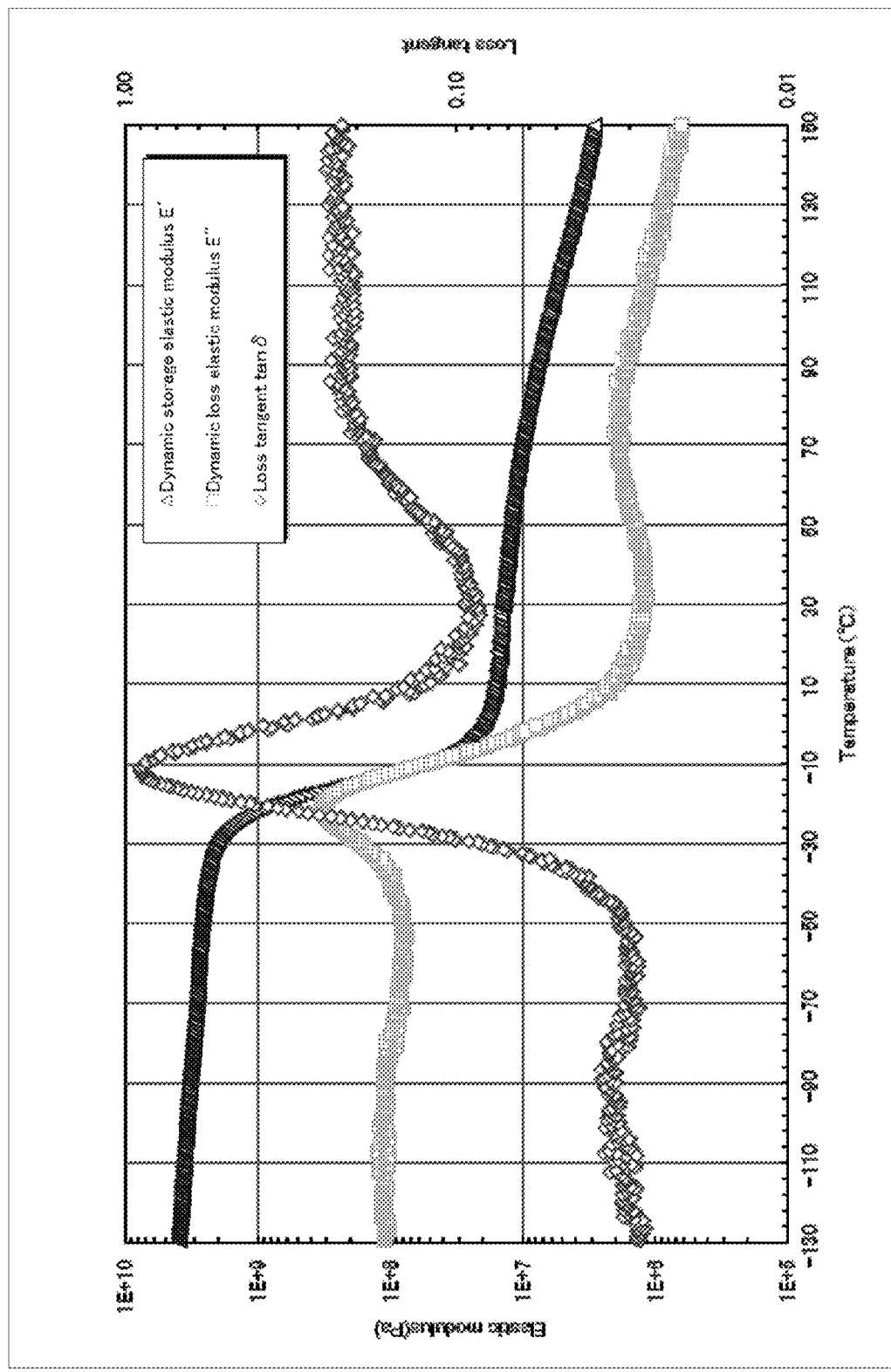

[FIG. 5] is a drawing which shows master curve calculation results of dynamic viscoelasticity from measuring results of storage elastic modulus E', loss elastic modulus E" and loss tangent tan δ, which are dynamic viscoelasticity properties, measured by tensile mode of specimen of gloves (emulsion film prepared by casting emulsion aqueous solution and vacuum dried for 72 hours at 40° C. is used).

Figure 6:
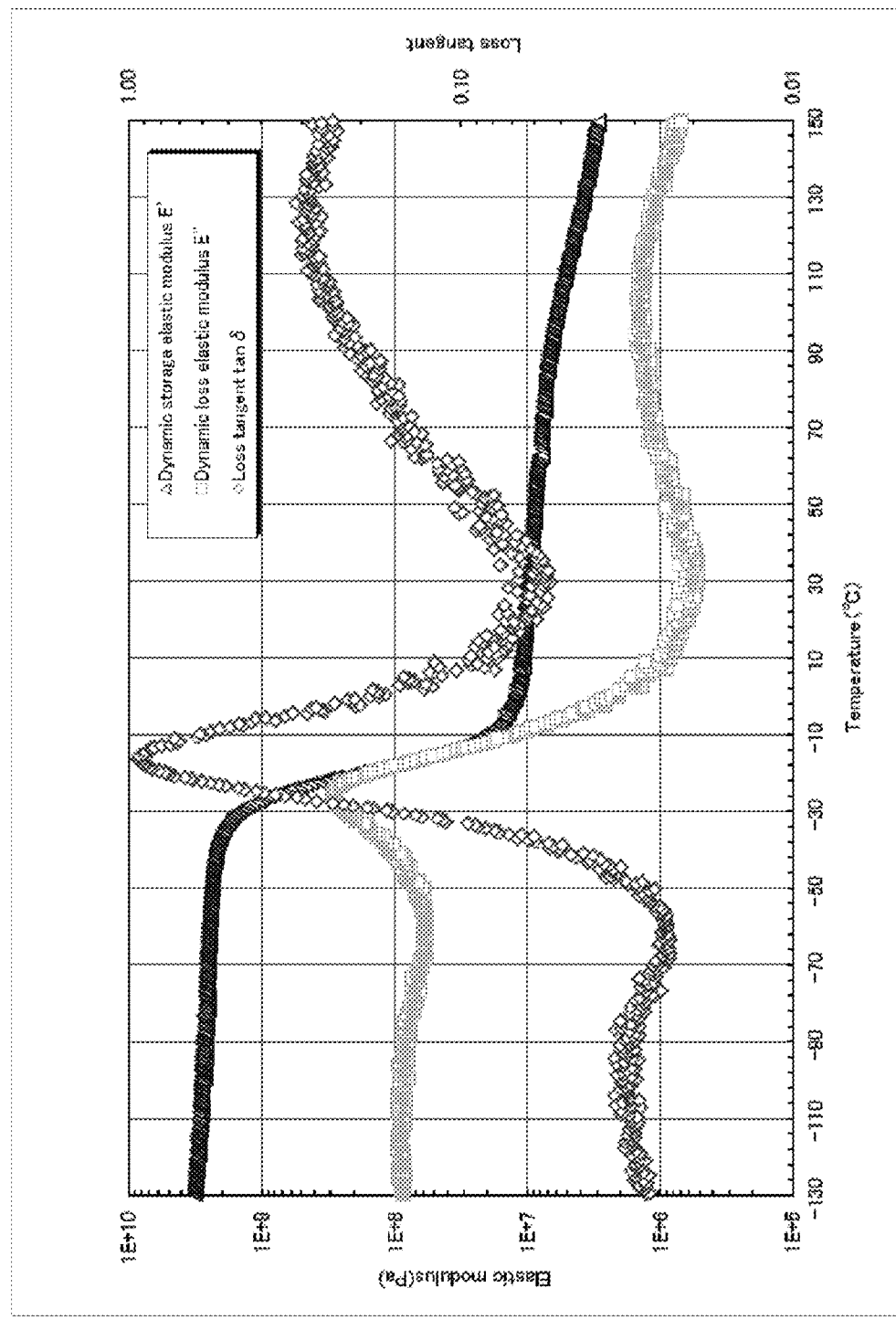

[FIG. 6] is a drawing which shows master curve calculation results of dynamic viscoelasticity from measuring results of storage elastic modulus E', loss elastic modulus E" and loss tangent tan δ, which are dynamic viscoelasticity properties, measured by tensile mode of specimen of gloves of conventional VERTE710 (same as FIG. 5).

[FIG. 7] is a drawing comparing loss tangent tan δ of SXL (present invention glass transition temperature is −10.1° C.), 6322 (glass transition temperature is −12.2° C.) and Nipol 550.

Figure 8:
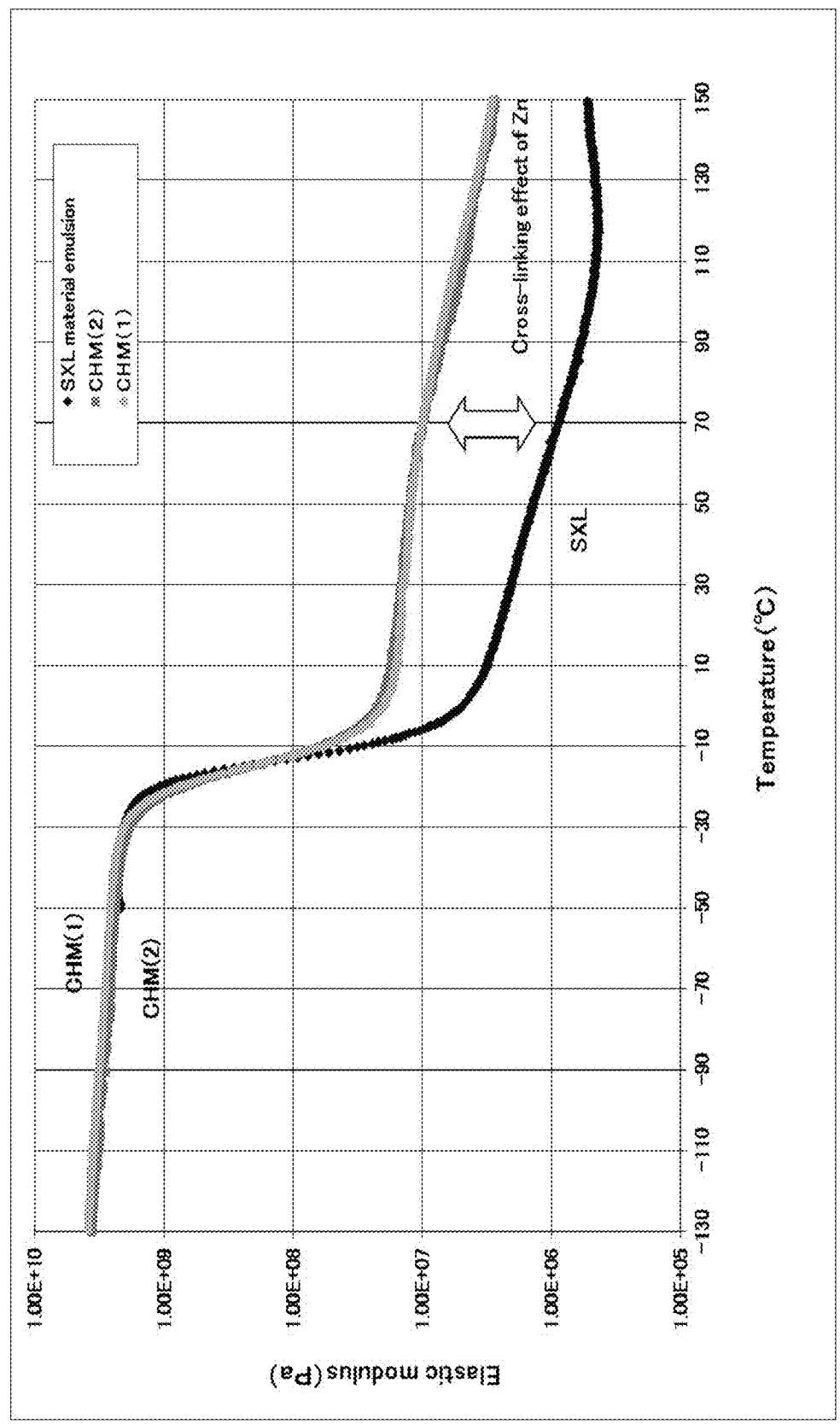

[FIG. 8] is a drawing comparing loss tangent tan δ of CHM materials emulsion and glove product.

[FIG. 9] is a drawing comparing loss tangent tan δ of sulfur vulcanized materials emulsion and glove product.

Figure 10:
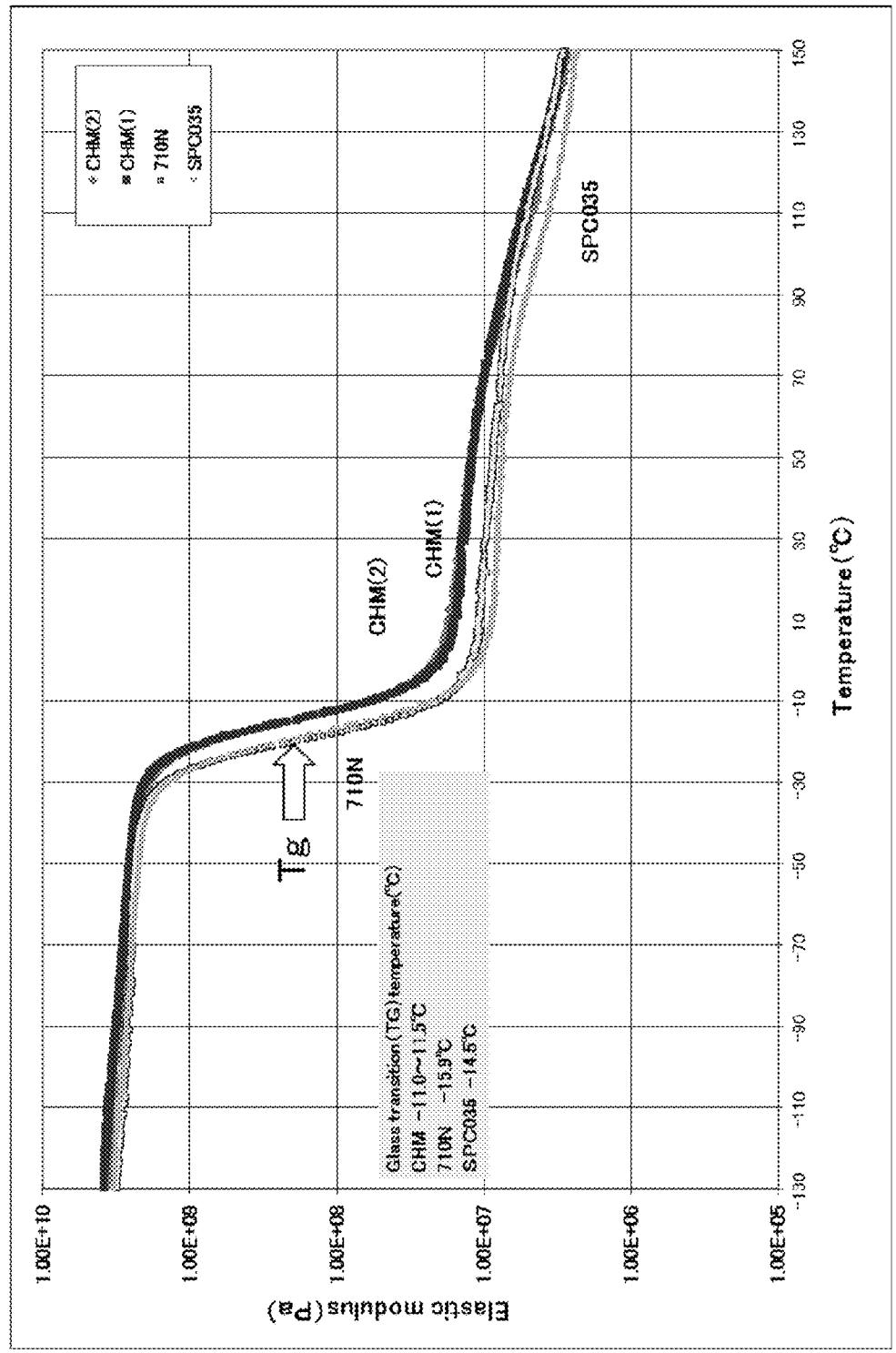

[FIG. 10] is a drawing comparing loss tangent tan δ of CHM materials emulsion (starting materials of the present invention) and sulfur vulcanized materials.

Figure 11:
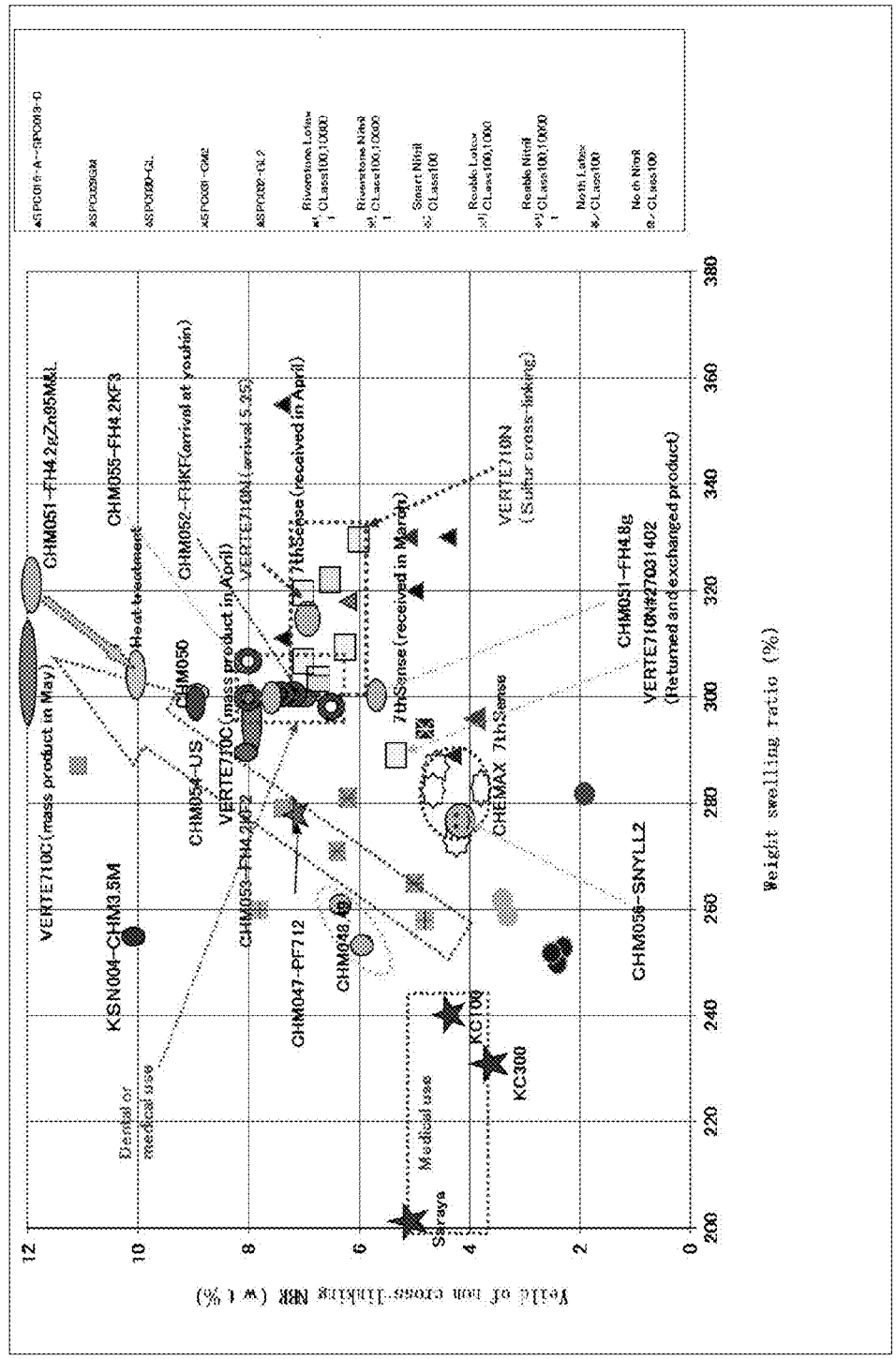

[FIG. 11] is a drawing which investigates relationship of amount of non vulcanized rubber and weight swelling ratio.

Figure 12:
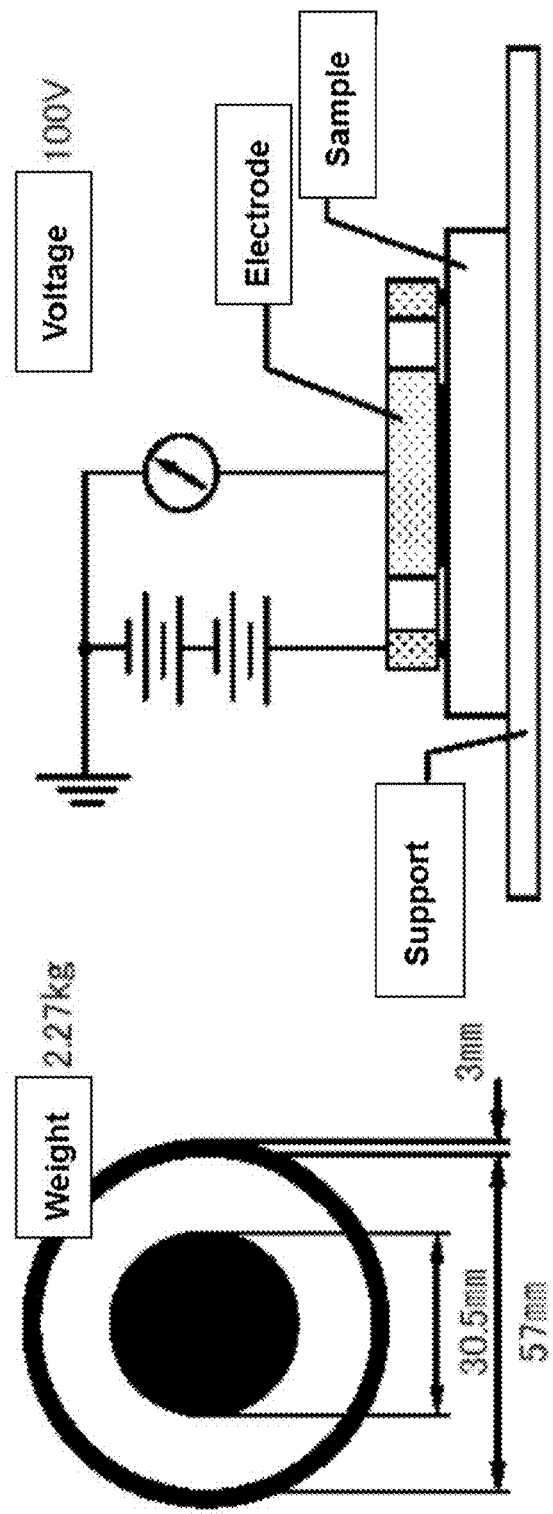

[FIG. 12] shows a measuring apparatus of surface resistance ratio of gloves.

Figure 13:
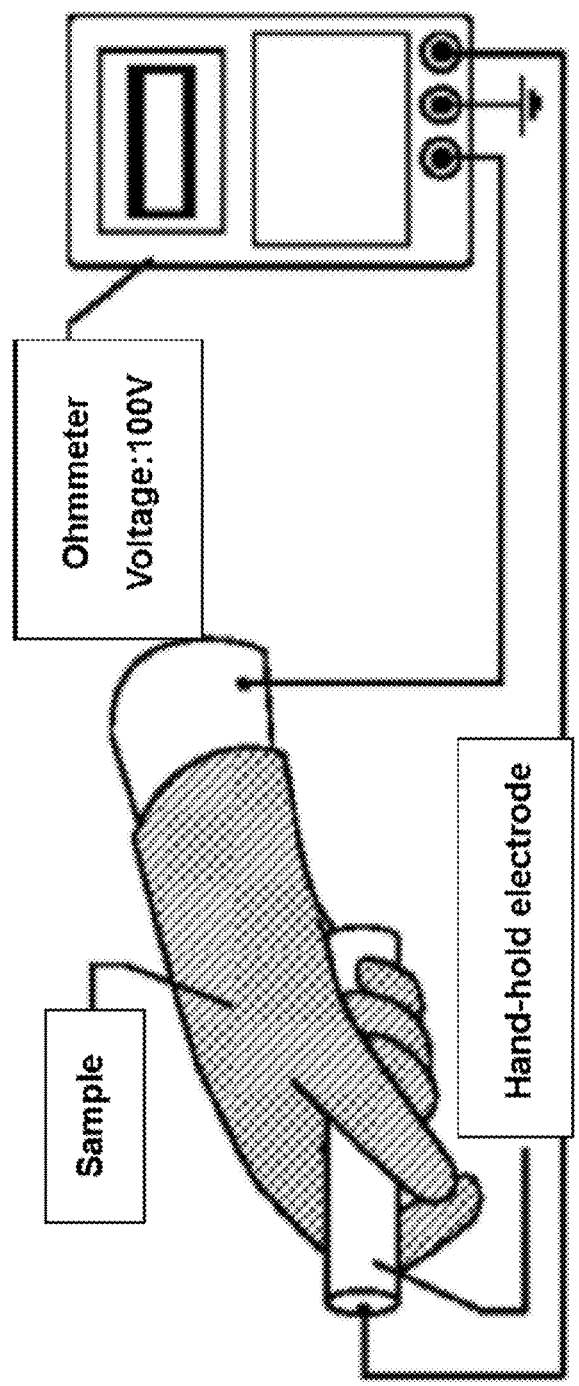

[FIG. 13] shows a measuring apparatus of resistance when gloves is put on.

Figure 14:
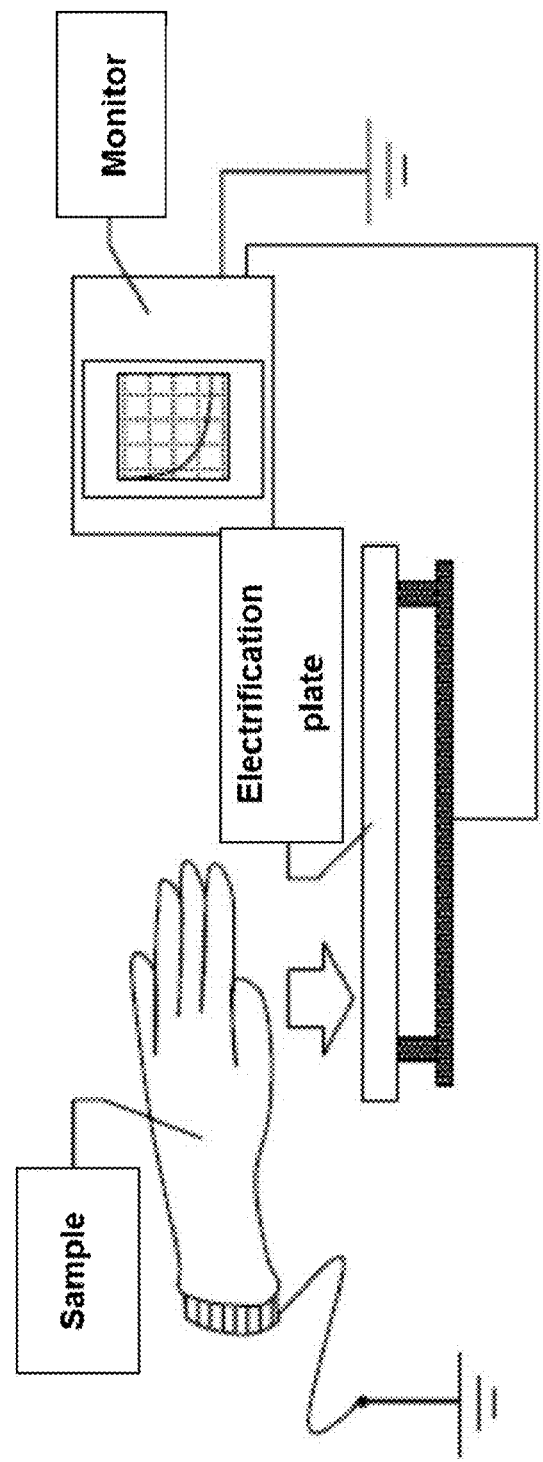

[FIG. 14] shows a measuring apparatus of decay of charge.

PREFERRED EMBODIMENT OF THE INVENTION

The present invention is in acrylonitrile-butadiene unsaturated carboxyl acid obtained by adding unsaturated carboxyl acid to acrylonitrile-butadiene or acrylonitrile-butadiene unsaturated carboxyl acid, (1) elastomer composition of emulsion of acrylonitrile-butadiene unsaturated carboxyl acid on which first step crosslink is performed, (2) after first step crosslink is formed, elastomer composition of emulsion of acrylonitrile-butadiene unsaturated carboxyl acid on which second step crosslink is performed is obtained. (3) Using elastomer composition of emulsion of acrylonitrile-butadiene unsaturated carboxyl acid on which second step crosslink is performed, a gloves of new properties is obtained. Products obtained by said processes of (1) to (3) possesses specific properties.

(1) An elastomer composition of emulsion of acrylonitrile-butadiene unsaturated carboxyl acid on which first step crosslink is performed can be illustrated as follows.

By reacting an end group of acrylonitrile-butadiene unsaturated carboxylic acid obtained by adding unsaturated carboxylic acid to acrylonitrile-butadiene or acrylonitrile-butadiene unsaturated carboxylic acid with an end group of acrylonitrile-butadiene unsaturated carboxylic acid obtained by adding unsaturated carboxylic acid to other acrylonitrile-butadiene or acrylonitrile-butadiene unsaturated carboxylic acid, end groups of unsaturated carboxylic acid are bonded, thus first step crosslink is performed, then, emulsion consisting of acrylonitrile-butadiene unsaturated carboxylic acid elastomer obtained by adding acrylonitrile-butadiene unsaturated carboxylic acid to said acrylonitrile-butadiene or acrylonitrile-butadiene unsaturated carboxylic acid to which first step crosslink is performed can be prepared.

Acrylonitrile-butadiene unsaturated carboxylic acid, which is a reacted product comprises 25-30 weight % of acrylonitrile, 62-71 weight % of butadiene and 4-8 weight % of unsaturated carboxylic acid (total 100 weight %) and is specified by amount ratio of each component. The part where crosslink is performed on larger weight part of 62-71 weight % of butadiene. Amount of unsaturated carboxylic acid, which is used for crosslink, is smallest amount among these three components.

Properties of the emulsion composed of acrylonitrile-butadiene unsaturated carboxylic acid elastomer obtained by adding unsaturated carboxylic acid to acrylonitrile-butadiene or acrylonitrile-butadiene unsaturated carboxylic acid are mentioned as follows.

That is, an elastomer composition consisting of 25-30 weight % of acrylonitrile, 62-71 weight % of butadiene and 4-8 weight % of unsaturated carboxylic acid (total 100 weight %), crosslink by a bond by at least a part of substituent possessed by said unsaturated carboxylic acid is formed, is an emulsion characterized that residual substituent of at least one part of substituent possessed by said unsaturated carboxylic acid is in state of free, Mooney viscosity ($ML_{(1+4)}$ (100° C.)) of cross linked product is 100-220 and film weight swelling ratio is 200-400%.

Starting materials composition comprising 25-30 weight % of acrylonitrile, 62-71 weight % of butadiene and 4-8 weight % of unsaturated carboxylic acid (total 100 weight %) can be obtained by mixing those starting materials under the presence of a dispersing agent.

Carbolylated acrylonitrile polybutadiene latex (SXL-XNPR and 746SXL of Sintomer Co., Ltd.) can be used. Further, selectively used by selecting at least one from a group consisting of Pure Product of Polymer Latex and Polyac 560 of Shin Foong Co., Ltd.

It is considered that although an end group is formed in unsaturated carboxylic acid prepared by adding unsaturated methacrylic acid to acrylonitrilebutadien, in unsaturated carboxylic acid prepared by adding unsaturated methacrylic acid to other acrylonitrile-butadien bond is not formed between end groups.

As an end group of unsaturated carboxylic acid used for crosslink, any kind of end group which can form a bond with an end group of other unsaturated carboxylic acid can be voluntarily used. An end group of unsaturated carboxylic acid used for a bond is, for example, carboxylic group, methylol amide group, reaction product of carboxylic group and amine or reaction product of carboxylic group and alkyl alcohol.

These end groups can be introduced directly into unsaturated carboxylic acid or can be introduced voluntarily by means of substitution. Crosslinking is carried out by heating at 40° C. and under presence of water and surfactant.

Forming reaction of crosslink is illustrated as follows

Prepare an acrylonitrile-butadiene unsaturated carboxylic acid elastomer obtained by adding unsaturated carboxylic acid to acrylonitrile-butadiene or acrylonitrile-butadiene unsaturated carboxylic acid to which the first step crosslink is performed by bonding an end group of unsaturated carboxylic acid added to acrylonitrile-butadiene unsaturated carboxylic acid obtained by adding unsaturated carboxylic acid to acrylonitrile-butadiene or acrylonitrile-butadiene unsaturated carboxylic acid with an end group of unsaturated carboxylic acid added to other acrylonitrile-butadiene unsaturated carboxylic acid obtained by adding carboxylic acid to acrylonitrile-butadiene or acrylonitrile-butadiene unsaturated carboxylic acid. This method is synonymous with the reaction method mentioned below.

An elastomer, which is characterized that acrylonitrile-butadiene or acrylonitrile-butadiene unsaturated carboxylic acid (or methacrylic acid) is added to unsaturated carboxylic acid (or methacrylic acid) to which unsaturated carboxylic acid (or methacrylic acid) polymer is added at the middle of acrylonitrile-butadiene part or at the middle of acrylonitrile-butadiene of acrylonitrile-butadiene unsaturated carboxylic acid part, prepared by adding unsaturated carboxylic acid (or methacrylic acid) to acrylonitrile butadiene, after forming an elastomer of acrylonitrile-butadiene to which unsaturated carboxylic acid (or methacrylic acid) is previously added or not added.

As an embodiment of above mentioned method, acrylonitrile and butadiene is polymerized in emulsion state emulsion, and acrylonitrile-butadiene polymer is prepared. By adding unsaturated carboxylic acid (or methacrylic acid) in the first, copolymer of unsaturated carboxylic acid (or methacrylic acid) and acrylonitrile-butadiene is obtained (case 1). In other case which does not add unsaturated carboxylic acid (or methacrylic acid) in the first, acrylonitrile and butadiene polymer is used (case 2).

Above mentioned is an meaning of "acrylonitrile-butadiene to which unsaturated carboxylic acid is previously added or not added". In Case 1, amount of unsaturated carboxylic acid to be added is minute.

To a polymer of unsaturated carboxylic acid, methacrylic acid and acrylonitrile-butadiene obtained by adding unsaturated carboxylic acid (or methacrylic acid) in the first, unsaturated carboxylic acid (or methacrylic acid) is further added, and obtain a polymer of unsaturated carboxylic acid (or methacrylic acid) and acrylonitrile-butadiene in which unsaturated carboxylic acid (or methacrylic acid) is existing in butadiene part of said same or different polymer (case 3). By adding unsaturated carboxylic acid (or methacrylic acid) to a polymer of acrylonitrile and butadiene to which unsaturated carboxylic acid (or methacrylic acid) is not added in the first, and obtain a polymer of unsaturated carboxylic acid (or methacrylic acid) and acrylonitrile-butadiene in which unsaturated carboxylic acid (or methacrylic acid) is existing in butadiene part of said same or different polymer (case 4).

Reaction caused in case 3 and case 4 is follows.

Butadiene part of acrylonitrile-butadiene is active. To these parts of acrylonitrile-butadiene, unsaturated carboxylic acid (or methacrylic acid) is added and branched or elongates molecular chain by graft polymerization.

Sometimes, branch is caused between active part of another butadiene part of neighboring molecule to which unsaturated carboxylic acid (or methacrylic acid) is added or graft polymerization is caused.

Elastomer composition which bonds with an end group of other acrylonitrile-butadiene elastomer unsaturated carboxylic acid through a part of above mentioned end group, and at least other residual part is left in not bonded state is the first step crosslinking.

Property of elastomer of acrylonitrile-butadiene elastomer unsaturated carboxylic acid obtained by first step crosslink is confirmed to be following state by actual measurement. Range of Mooney viscosity ($ML_{(1+4)}(100°\ C.)$) is 100-220. When Mooney viscosity exceeds 220, molecular weight is too high and processing ability s not so good. When Mooney viscosity is less than 100, it becomes difficult to maintain adequate intensity and to form film. When Mooney viscosity is compared with similar products, 746SXL of Shintomer Co., Ltd., is around 128, 6322 which is conventional product is 122 and Nipol 550 is around 94. Further, Mooney viscosity of general NBR is 30-130.

In crosslink of this step crosslink, it can be understood by Mooney viscosity that the elastomer has higher molecular weight (weight average) than conventional one.

In preparation of emulsion composition by crosslink, since small amount of sulfur is not contained and vulcanizing accelerator is not used, delayed IVtype hypersensitivity which is caused by vulcanizing accelerator is not caused.

Emulsion composition obtained in first step crosslink is processed to film at the temperature of 40° C., and film weight swelling ratio can be measured. As the result, film weight swelling ratio is 200-400%.

Film weight swelling ratio is defined as follows.

Film weight swelling ratio (%)=weight (g) after swelling× 100/weight (g) before swelling−100. Property that the film weight swelling ratio is 200-400% indicates that the film of small amount of cross linked is obtained without crosslinking treatment only by dry treatment at 40° C. This is caused by first step crosslink, therefore, a glove of sufficient property (tensile strength and intensity to break) can be obtained by not performing sulfur crosslink in the present invention.

Further, the property that the film weight swelling ratio is 200-400% indicates that the product has elasticity.

Emulsion composition obtained in first step crosslink indicates has property of specific Mooney viscosity and film weight swelling ratio mentioned above. Accordingly, it becomes clear that the emulsion composition has elasticity regardless to have respectively high molecular weight.

Emulsion composition of 151 Mooney viscosity, 287% of film weight swelling ratio, and of 180 Mooney viscosity, 336% of film weight swelling ratio can be obtained from active measuring results.

(2) Emulsion elastomer composition crosslinked by first step crosslink and second step crosslink is mentioned below.

Elastomer composition whose film weight swelling ratio is 200-400%, being consisted of 25-30 weight % of acrylonitrile, 62-71 weight % of butadiene and 4-8 weight % of unsaturated carboxylic acid (total 100 weight %), covalent bond by bond of at least one part of substituent possessed by said unsaturated carboxylic acid is formed and residual substituent in at least one part of substituent possessed by said unsaturated carboxylic acid is crosslinked by forming ionic bond through bivalent metallic ion. Since the elastomer composition is crosslinked by ionic bond through bivalent metallic ion, Mooney viscosity cannot be measured.

In a case to perform second step crosslink, crosslink by ionic bond through bivalent metallic ion is performed on elastomer composition to which said first step crosslink is already accomplished.

Emulsion composition is prepared by containing 100 phr of elastomer composition, 0.5-4.0 phr of crosslinking agent consisting of bivalent metallic ion, 0.1-2.0 phr of pH adjusting agent to adjust pH to 9-10, 0.5-2.0 phr of dispersing agent and water, said water is added by amount so as the concentration of total solid compound (TSC) to be 18-30 weight %, and by mixing these components.

Said elastomer composition is the emulsion elastomer which is formed in the first step. Concretely, said elastomer composition is a emulsion comprising of 25-30 weight % of acrylonitrile, 62-71 weight % of butadiene and 4-8 weight % of unsaturated carboxylic acid (total 100 weight %), crosslink is performed by bond of at least one part of substituent possessed by said unsaturated carboxylic acid is formed, while residual substituent in at least one part of substituent possessed by said unsaturated carboxylic acid is in the state of free, and crosslinked product is characterized to be 100-220 of Mooney viscosity ($ML_{(1+4)}$(100° C.)) and 200-400% of film weight swelling ratio. Said emulsion consisting of 25-30 weight % of acrylonitrile, 62-71 weight % of butadiene and 4-8 weight % of unsaturated carboxylic acid (total 100 weight %) can be obtained by adding unsaturated carboxylic acid to acrylonitrile-butadiene which possesses or not possesses unsaturated carboxylic acid.

An elastomer composition characterized that end groups of unsaturated carboxylic acid used for a bond by at least a part of substituent possessed by said unsaturated carboxylic acid is forming a bond with one selected from the group consisting of carboxylic group, methylolamide group, reacted product of carboxylic group and diamine and reacted product of carboxylic group and alkyl alcohol, and is bonded with an end group of other acrylonitrile-butadiene elastomer unsaturated carboxylic acid through a part of these end group and at least one part of other part is not bonded.

Regarding an end group of unsaturated carboxylic acid added to acrylonitrile-butadiene carboxylic acid, which is an end group in free state, likewise an end group of unsaturated carboxylic acid added to acrylonitrile-butadiene unsaturated carboxylic acid, which is an end group in free state, can be crosslinked forming ionic bond by bivalent metallic ion, concretely, by zinc metal ion, by above mentioned treatment.

After branch is formed by a reaction to form an end group or after graft polymerization is performed, a carboxylated part by reaction with unsaturated carboxylic acid (or methacrylic acid) and unsaturated carboxylic acid monomer (or methacrylic acid) is bonded by bivalent metallic ion, by reacting with butadiene part, further with other butadiene part. This is illustrated by lower left side drawing of FIG. 1 and left side drawing of FIG. 2.

After branch is formed by a reaction to form an end group or after graft polymerization is performed, some parts remain in the state that the reaction is stopped. Between said parts, ion bonds can be formed by bonding of bivalent metallic ion.

Said crosslinking treatment is considered to cause following reactions on carboxylated acrylonitrile-butadiene. Considerable crosslinking reactions are mentioned below.

(A) Methacrylic acid monomer performs graft polymerization with double bond carbon of butadiene part of carboxylated acrylonitrilebutadien. Carboxyl group of acrylonitrile-butadiene, whose carboxylic group of methacrylic acid is carboxylated, is bonded by ionic bond through zinc ion with carboxylic group of carboxylated acrylonitrile-butadien and forms crosslink.

(B) Methacrylic acid polymer larger than dimmer forms graft polymerization with double bond carbon of butadiene part of carboxylated acrylonitrile-butadien. Carboxylic group of methacrylic acid is bonded by ionic bond through zinc ion with carboxylic group of carboxylated acrylonitrile-butadien and forms crosslink.

(C) Methacrylic acid monomer crosslinks between double bond carbons of butadiene part of carboxylated acrylonitrile-butadien. Carboxyl group of methacrylic acid bonds with carboxyl group of carboxylated acrylonitrile-butadien by ionic bond through zinc ion.

(D) Methacrylic acid polymer larger than dimmer crosslinks between double bond carbons of butadiene part of carboxylated acrylonitrile-butadien. Carboxyl group of methacrylic acid bonds with carboxyl group of carboxylated acrylonitrile-butadien by ionic bond through zinc ion.

A case which uses conventional vulcanization reaction by sulfur and ionic crosslink by metallic ion (left side of FIG. 2) is compared with a case of the present invention, namely, beforehand crosslink by reactive vinyl compound and ionic crosslink by metallic ion (right side of FIG. 2). The former is characterized that alkyl group exists between butadiene part of different polymer and forms crosslink by simple structure, on the contrary, the latter is characterized to use complicated and manifold crosslinking reaction, that is, inner crosslink by unsaturated carboxylic acid (or mathacrylic acid) and crosslink of carboxylic group by ionic bond by zinc oxide through state that forming branch or performing graft polymerization or not through said state. In the case of latter, it can be said that the state of easy crosslinking is formed at crosslink and uses the state. In the case of latter, it can be understood that unsaturated carboxylic acid (or mathacrylic acid) remains as an unreacted compound in polymer prepared by adding unsaturated carboxylic acid (or mathacrylic acid) to said acrylonitrile-butadien.

Actually, from the measuring results using GCMAS (FIG. 3), in latter (lower drawing of FIG. 3), peak 1 of unsaturated carboxylic acid (or mathacrylic acid) monomer is observed. In upper drawing of FIG. 3, which uses crosslinked elastomer crosslinked using sulfur and sulfur compound, peak 1 of unsaturated carboxylic acid monomer is not observed.

Since this crosslink formation is progressed by emulsion state, a dispersing agent is used. To obtain good dispersed state, use of a surfactant such as alkyl benzene sulfonate, which is anionic surfactant, is indispensable. Said alkyl benzene sulfonate is not a crosslinking agent or a vulcanizing accelerator but a dispersing agent. In emulsion after second step crosslink, alkyl benzene sulfonate, which is an anionic surfactant and a dispersing agent, is contained. By containing said compound, sulfur can be detected. Sulfur as a crosslinking agent or sulfur compound do not exist. By presence of the vulcanizing accelerator containing sulfur compound, contact determatitis delayed IV type hypersensitivity which is allergic symptom is not mabe manifest.

Potassium hydroxide is used as a pH adjusting agent. This is used for the purpose to adjust pH to 9-10 as crosslinking condition. And amount to be used is 0.1-2.0 phr. When the amount is less than 0.1 phr or over than 2.0 phr, it is not sufficient to maintain said pH.

As a dispersing agent, anionic surfactant is used. Specifically, sodium salt of naphthalene sulfonate polyaggregate or alkyl benzene sulfonate can be used. Although these compound is sulfur composition and used as a dispersing agent, these compound is detected as sulfur. However, these compounds are not used as a crosslinking agent or a vulcanizing accelerator and do not cause allergy.

Products on the market can be purchased and can be used. For example, Tamol NN9104 can be used. Amount to be used is 0.5-2.0 phr. This dispersing agent is helpful to carry out interfacial polymerization. Or by treating under adequate temperature condition, this agent can be extruded sufficiently.

Titanium dioxide can be added as a whitening agent or a color promoting agent. If necessary, a coloring material can be added. As a coloring material, an organic dye can be used.

As an anti oxidant, specifically, non pollution type polymeric hindered phenol, for example, Wingstay L can be used.

In a case to use the composition to prepare said elastomer, adjustment by water to adjust total solid compound (TSC) to 18-30 weight % is carried out at mixing process of each materials.

Property of acrylonitrilebutadien unsaturated carboxylic acid on which second step crosslink is performed after first step crosslink, specifically behavior of dynamic viscoelasticity is investigated and following points are confirmed.

In the present invention, sulfur or sulfur containing compound are not used as a crosslinking agent or a vulcanizing accelerator in the first step. This invention does not contain sulfur or sulfur containing compound and is different from conventional crosslink product from this point, and this invention can form crosslink which does not cause delayed IVtype hypersensitivity (in a case when anionic surfactant is used as a dispersing agent, the amount of it is small, and does not cause delayed IVtype hypersensitivity).

According to the measuring results of dynamic viscoelasticity mentioned below, product of the present invention can improve the effect of crosslink according to crosslinking treatment by first step crosslink and second step crosslink. Especially, effects caused by use of zinc are follows.

(1) Temperature that indicates maximum value of loss tangent indicated by tan δ (ratio of storage elastic modulus/loss elastic modulus) is corresponding to glass transition temperature (Tg) at the transition temperature region from rubber is in freezing state to start micro Brownian motion, and glass transition temperature becomes high when basic molecular motion is depressed (be hard to move), for example, rigid molecular chain or crosslinking density becomes large (refer to FIG. 7). Acrylonitrile-butadien unsaturated carboxylic acid of the present invention (indicated by SXL) is measured as −10.1° C. In a case of 6322, which is a conventional product, glass transition temperature is −12.2° C., and in case of Nipol is −11.6° C.

Acrylonitrile-butadien unsaturated carboxylic acid of the present invention (indicated by SXL) shows higher results when compared with other product. The reason why is considered as follows, that is, because the degree of enmesh, namely, crosslinking density by self crosslinking is high. Further, it is observed that Nipol 550 is extremely short.

(2) Storage elastic modulus of flat rubber state region which is high temperature region higher than glass transition temperature becomes high when crosslinking density by enmeshing becomes higher and molecular weight (Mc) between crossrinking chain becomes shorter. Length of flat part of rubber state region (temperature region) is known to indicate correlation with enmeshing number per one molecule.

According to FIG. 7, increase of elastic modulus of acrylonitrile-butadiene unsaturated carboxylic acid gloves prepared by zinc adding vulcanization at flat part of rubber state region is larger than that of sulfur vulcanization product. That is, increase of elastic modulus by adding zinc is large, and it reflects improvement of crosslinking density by addition of zinc.

According to FIG. 8, Tg temperature of gloves made of acrylonitrile-butadiene unsaturated carboxylic acid (from −11.0 to 1.5° C.) is higher than that of sulfur vulcanized rubber (from −14.5 to −15.9° C.) and this tendency is caused by following phenomenon. That is, elastic modulus decreases and sifts to higher temperature side, width of transition temperature extends, storage elastic modulus drops slowly and elastic modulus of flat part becomes higher.

From FIGS. 7 and 8, effect of addition of the present invention can be confirmed.

Prescription to perform second step crosslinking treatment after first step crosslinking treatment are shown in Table 1.

TABLE 1

| Name of agent | Phr |
|---|---|
| Elastomer emulsion consisting of unsaturated carboxylic acid and acrylonitrile-butadiene to which first step closslink is performed | 100 |
| KOH (alkaline compound) | 0.1-0.2 |
| zinc oxide (crosslinking agent) | 0.5-4.0 |
| titanium dioxide (white) | 0.2-3.0 |
| dispersing agent | 0.5-2.0 |
| anti oxidant | 0.1-1.5 |
| coloring agent | voluntarily |
| water to bring solid phase to 18-30 weight % | voluntarily |

Gloves made of thin film of elastomer formed by following process.

Gloves made of elastomer prepared by following processes. That is, the elastomer is comprising 25-30 weight % of acrylonitrile, 62-71 weight % of butadiene and 4-8 weight % of unsaturated carboxylic acid (total 100 weight %), crosslinked by a bond by at least one part of substituent possessed by said unsaturated carboxylic acid is formed and residual substituents of at least one part of substituents possessing unsaturated carboxylic acid is crosslinked by bivalent metal, and does not contain sulfur which is crosslinking agent and sulfur compound which is a vulcanization accelerator, further Mooney viscosity ($ML_{(1+4)}(100°$ C.)) of said elastomer which is crosslinked by a bond by at least one part of substituent possessed by said unsaturated carboxylic acid is 100-220. Gloves of thin film made of the elastomer does not contain sulfur which is crosslinking agent and sulfur compound which is a vulcanization accelerator, thickness is 0.05-0.15 mm, swelling ratio at glove preparation is from 240 to 320, tensile stress is 22-35 MPa, breaking elongation is 32-35%, elongation at breaking is 480-620% and tensile stress at 500% elongation is 15-35 MPa.

(a) process to wash a mold or a former by washing water and to dry.

(b) process to dip the mold or the former into solution of coagulant.

(c) process to dry the mold or the former to which coagulant is stuck.

(d) process to dip the mold or the former to which coagulant is stuck and dried into elastomer composition mentioned in claim 4 or claim 5 for 1-20 seconds under temperature condition of 30° C.

(e) process to dry the mold or former obtained in (d) process at 80-120° C.

(f) composition prepared by crosslinking the elastomer obtained by addition reaction of unsaturated carboxylic acid to acrylonitrile-butadiene elastomer mentioned in claim 4 on the mold or the former prepared in above mentioned process (e).

In the present invention, a gloves of thin film of elastomer is formed according to following processes.

(a) process to wash a mold or a former by washing water so as to remove stains, then wash it with cold water and to dry it.

(b) process to dip the mold or former into solution of coagulant containing 8-17 weight % of $Ca^{2+}$ ion.

The coagulant is prepared as aqueous solution which contains 8-17 weight % of $Ca^{2+}$, desirably 8.0-17.0 weight % of $Ca^{2+}$ by solving calcium nitrate. The mold or the former is dipped in said solution. Consequently, coagulant is stuck on the surface of the mold or the former. Time for dipping can be voluntarily decided. Ordinary, the time is 10-20 seconds. A wetting agent or an anti adherence agent can be added. Concretely, zinc stearate and calcium stearate, (c) process to dry the mold or the former to which coagulant is stuck by 50-70° C. and to dry whole surface of the gloves or a part.

The mold or the former to which coagulant is stuck is dried by 50-70° C. and to dry whole or partial surface of the gloves.

(d) process to dip the mold or former to which coagulant is stuck into elastomer composition mentioned in claim 4 or claim 5 for 1-20 seconds under temperature condition of 30° C.

By dipping the mold or former to which coagulant is stuck into composition to prepare elastomer for 1-20 seconds under temperature condition of 25° C.-30° C., composition to prepare elastomer is stuck. Dipping process can be repeated several times. Ordinary, this process is repeated 2 times or more.

(e) process to wash the mold or former obtained in (d) process by water and remove agents (leaching process).

A former which is coated partially by dried latex is leached in a leaching tank containing hot water (30-70° C.) for 90-140 seconds.

(f) process to bead the mold or the former obtained in (e) process (sleeve winding process).

After leaching process, the mold or former are beaded (sleeve winding process).

(g) process to dry the mold or former obtained in (f) process in a furnace.

The glove former is dried at 120-150° C. for 250-300 seconds.

(h) process to crosslink the mold or the former obtained in (g) process.

The glove former coated by dried latex is crosslinked at 120-150° C. for 250-300 minutes.

(i) process to dry the crosslinked elastomer on the surface of the mold or former obtained in (h) process after post leaching (to remove contained agent by washing with water).

The post leaching is carried out by the condition of 30-80° C. for 60-80 seconds.

By above mentioned continuous processes, a thin film glove of the elastomer can be prepared.

Following processes can be added.

(j) process to treat the surface of elastomer film, which is post leached by (i) process and dried, by chlorine so as to remove sticky feeling (tackiness), then neutralize and wash with water.

Chlorine treatment is carried out by dipping dried crosslinked elastomer on the mold or the former into chlorine solution in treating vessel. Consequently, the surface of film of glove shape is reacted and thickness of the surface becomes slightly thinner.

(k) process to wash and dry the film of elastomer, the surface of which is treated by chlorine, on the mold or former. By this process, sticky feeling (tackiness) of the surface is removed.

(l) process to detach chlorine treated elastomer film from the mold or former and to turn it over.

Main processes in above mentioned processes are mentioned below.

(a) process to dip the mold or the former into solution of coagulant containing 8-17 weight % of $Ca^{2+}$ ion.

(b) process to dry the mold or the former to which coagulant is stuck by 50-70° C. and to dry whole surface of the gloves or a part.

(c) process to dip the mold or former to which coagulant is stuck obtained in said (b) process into composition to prepare elastomer for 1-20 seconds under temperature condition of 30° C.

(d) process to dry the mold or former obtained in (c) process at 80-120° C.

(e) process to crosslink and harden the elastomer on the surface of the mold or former obtained in (d) process at 120-150° C. for 20-30 minutes.

Properties of the gloves obtained in the present invention are mentioned below.

As shown in Examples, the gloves of the present invention does not contain a crosslinking agent which contains sulfur and sulfur compound and a vulcanizing accelerator which contains sulfur.

Analysis of components (11 components: C, H, N, O, S, Zn, Ca, Cl, Na, K and Ti) of specimen of rubber glove is carried out. From the results of quantitative analysis using an ICP emission spectrometry analysis equipment, 0.31 weight % of sulfur is detected. This sulfur is considered to be originated from sulfone group of anionic surfactant used as a dispersion. All analytical results are shown in Table 5 of Example 4 and Table 6 of Example 5. Relationship between properties of the present invention, that is, Mooney viscosity, glove swelling ratio, Zn, braking elongation and tensile stress at 500% elongation are shown in Table 2.

TABLE 2

| Mooney viscosity $ML_{(1+4)}$ (100° C.) | glove swelling ratio (%) | ICP analytical result Zn | braking elongation (%) | tensile stress at 500% elongation (%) |
|---|---|---|---|---|
| 110 | 290 | 0.8 | 560 | 24 |
| 110 | 280 | 0.9 | 580 | 28 |
| 140 | 280 | 0.8 | 540 | 26 |
| 140 | 240 | 1.0 | 520 | 31 |
| 180 | 300 | 0.8 | 530 | 25 |
| 180 | 270 | 0.9 | 510 | 32 |
| 220 | 320 | 0.7 | 600 | 17 |
| 220 | 270 | 0.9 | 530 | 24 |

Comparison with other gloves are summarized in Table 3

TABLE 3

| | | 746 SXL | 6322 | Highpore 550 |
|---|---|---|---|---|
| 1 | solid component (wt %) | 45.1 | 45.6 | 44.9 |
| 2 | solvent soluble component (wt %) | | | |
| | ① acetone soluble component | 30.0 | 30.1 | 50.6 |
| | ② THF soluble component | 33.1 | 32.0 | 98.6 |
| 2 | element in solid component | | | |
| | C (wt %) | 78.2 | 78.8 | 79.0 |
| | H (wt %) | 9.8 | 10.0 | 9.9 |
| | N (wt %) | 7.53, 7.48 | 7.5, 7.52 | 6.51, 6.62 |
| | S (wt %) | 0.3 | 0.5 | 0.5 |
| | others (wt %) | | | |
| 3 | water content in solid component | — | — | — |
| 4 | acrylonitrile (wt %) | 28 | 28 | 25 |
| 7 | volatile component in emulsion film (ppm) | 370 | 13 | 188 |
| 8 | carboxylic acid (wt %) | 4.07 | 4.01 | 3.76 |
| | | 4.15 | 4.36 | 3.73 |
| | average | 4.1 | 4.2 | 3.7 |
| 8 | Mooney viscosity $ML_{(1+4)}$ (100° C.) | 151 | 122 | 94 |
| | $ML_{(1+4)}$ (140° C.) | — | — | — |

TABLE 3-continued

|   | 746 SXL | 6322 | Highpore 550 |
|---|---|---|---|
| 9 viscosity of solution (mPa · s) | 26 | — | — |
| 9 particle size distribution | | | |
| ① average particle size (nm) | 176 | 178 | 141 |
| ② standard deviation (nm) | 19 | 30 | 24 |
| 10 dynamic viscoelasticity | | | |
| glass transition temp. (Tg) (° C.) | −10.1 | −12.2 | −11.6 |
| length of rubber region (° C.) | Tg~150 | Tg~150 | Tg~50 |
| elastic modulus of rubber region (MPa at 150° C.) | 0.52 | 0.44 | 0.09 |
| | | solid part: 45.6% | |

In Example 7, test results of skin susceptibility are indicated (Table 12). In the present invention there is no case to cause delayed IVtype hypersensitivity, and it is understood that there is no problem in health. When compared with conventional product, regarding Ca, Na and K, these items indicate lower analytical value.

Measuring results of thickness of the elastomer thin film gloves of the present invention shows that there is difference depending on the measured position, however is from 0.05 to 0.15 mm. Measuring results of tensile stress (intensity) of the elastomer thin film gloves of the present invention is 22-35 MPa and breaking elongation is 480-620%. Modulus between 10-15 MPa of the elastomer thin film gloves of the present invention is 500%. These facts are illustrated in Example 6 and results are shown in Table 7. These results indicate that the gloves of the present invention is equal to the conventional gloves which uses sulfur and sulfur containing compound (Table 8).

EXAMPLE 1

Mixture of methacrylic acid added to acrylonitrile-butadiene prepared by adding methacrylic acid to acrylonitrile-butadiene to which previously mathacrylic acid is added or not added (product of Syntomer Co., Ltd.: product name is Syntomer 746-SXL) is mixed with potassium hydroxide, zinc oxide, titanium dioxide, a dispersing agent, an anti oxidant, a coloring agent and water and a composition of concentration indicated in Table 2 is prepared.

Using this composition an elastomer thin film which does not contain sulfur as a crosslinking agent and a vulcanizing accelerator is prepared.

TABLE 4

| agents | phr |
|---|---|
| 746SXL elastomer emulsion of Syntomer Co., Ltd. on which first step crosslinking treatment is performed | 100 |
| KOH | 1.35 |
| zinc oxide | 1.2 |
| titanium dioxide | 0.75 |
| dispersing agent | 1.5 |
| anti oxidant | 0.25 |
| coloring agent | 0.05 |
| water to bring solid phase to 18-30 weight % | voluntarily |

EXAMPLE 2

Using a composition composed of a mixture obtained according to Table 4, a gloves made of elastomer thin film by dipping method mentioned below.
(a) process to wash a mold or former by washing water so as to remove stains, then wash with cold water and to dry.

Dried mold or former is treated by direct dipping method or coagulation agent dipping method.

Selection of these methods is depending on a kind of product. Direct dipping method is to dip dried mold or former into a mixture prepared by a recipe of the present invention.
(b) process to dip the mold or the former into solution of coagulant containing 8-17 weight % of $Ca^{2+}$ ion.

The coagulant is prepared as aqueous solution which contains 10 weight % of $Ca^{2+}$. The mold or the former is dipped into said solution. Consequently, coagulant is stuck on the surface of the mold or the former. Time for dipping is 10-20 seconds. A wetting agent or an anti adherence agent can be added. Concretely, zinc stearate and calcium stearate.
(c) process to dry the mold or the former to which coagulant is stuck by 60° C. and to dry whole or partial surface of the gloves.
(d) process to dip the mold or the former obtained in (c) process to which coagulant is stuck and dried into elastomer composition of the present invention for 1-20 seconds under temperature condition of 30° C.

By dipping the mold or the former to which coagulant is stuck into composition to prepare elastomer for 15 seconds under temperature condition of 30° C., and the elastomer is stuck. Dipping process can be repeated several times. Ordinary, this process is repeated 2 times or more.
(e) process to wash the mold or former obtained in (d) process by water and remove agents (leaching process).

The former which is coated partially by dried latex is leached in a leaching tank containing hot water (30-70° C.) for 90-140 seconds.
(f) process to bead (sleeve winding process) the mold or the former obtained in (e) process.

After leaching process, the mold or the former are beaded (sleeve winding process).
(g) process to dry the mold or the former obtained in (f) process in a furnace.

The glove former is dried at 120-150° C. for 250-300 seconds.
(h) process to crosslink the mold or the former obtained in (g) process.

Dried latex coated on the glove former is crosslinked at the condition of 120-150° C. for 20-30 minutes.
(i) process to dry the crosslinked elastomer on the surface of the mold or the former obtained in
(h) process after post leaching (to remove contained agent by washing with water).

The post leaching is carried out by the condition of 30-80° C. for 60-80 seconds. The process is carried out by dividing to two times.
(j) As a desirable process, the surface of gloves is treated by chlorine.

By above mentioned continuous processes, a thin film glove of elastomer can be prepared.

EXAMPLE 3

Comparative Example is mentioned.

Mixture of methacrylic acid added to acrylonitrile-butadiene prepared by adding methacrylic acid to acrylonitrile-butadiene to which previously mathacrylic acid is added or not added (product of Syntomer Co., Ltd.: product name is Syntomer 746-SXL) is mixed with potassium hydroxide, zinc oxide, titanium dioxide, a dispersing agent, an anti oxidant, a coloring agent and water and a composition of concentration indicated in Table 2 is prepared.

In the comparative Example, composition containing carboxylated acrylonitrile-butadiene latex (product of Synthomer Co., Ltd. product name is Synthomer 6322), ZnO (1.5 weight %) and sulfur (1.0 weight %) is used and a gloves is prepared, and these two gloves are compared. Regarding zinc oxide, a dispersing agent, a pH adjusting agent and an anti oxidant are same as mentioned in Examples. Weight of solid phase is 30 weight %. According to the processes mentioned in Example 2, gloves product (product name is Verte 10N) is prepared.

EXAMPLE 4

Comparison results of component analysis of the product of the present invention and product of Comparative Example (Verte 710N) are summarized in Table 5.

Analysis of components (11 components: C, H, N, O, S, Zn, Ca, Cl, Na, K and Ti) of specimen of rubber glove is carried out by CHNO Analyzer (EA1110 of CE Instruments) and ICP-AES system.

Quantitative analysis of sulfur is mentioned below.

Quantitative analysis of Zn and Ca is follows. Approximately 0.1 g of each evaporated residue is weighted and contained in platinum crucible and fused by mixed flux ($Na_2CO_3:Na_2B_4O_7=2:1$) and extracted by 30 ml of hydrochloric acid ($HCl:H_2O=1:1$). Then the extracted solution is diluted to 100 ml and quantitatively analyzed by an absorbancy analyzer. Regarding Cl, 1 g of each evaporated residue is weighted and contained in platinum crucible and fused by Eschka mixture and extracted with 100 ml of pure water, and the aqueous solution is quantitatively analyzed by an absorbancy analyzer. Further, regarding sulfur, said aqueous solution is used and quantitatively analyzed using ICP emission spectrometry analyzer.

Contents of sulfur.

Contents of sulfur in the gloves of the present invention is 0.31 weight %. While in Verte 710N, contents of sulfur is 1.10 weight %.

Contents of zinc.

Contents of zinc in the gloves of the present invention is 0.76 weight % and relatively small. While, in a case of conventional product, contents of zinc is 1.15 weight %. Contents of zinc in the gloves of the present invention is smaller than that of conventional one.

TABLE 5

| component | C | H | N | O | S | Zn |
|---|---|---|---|---|---|---|
| present invention | 77.9 | 9.8 | 7.1 | 3.0 | 0.31 | 0.76 |
| conventional | 73.1 | 9.2 | 6.6 | 4.9 | 1.1 | 1.15 |

TABLE 5-continued

| component | Ca | Cl | Na | K | Ti |
|---|---|---|---|---|---|
| present invention | 0.76 | 0.19 | 0.01 | 0.01 | 0.36 |
| conventional | 0.62 | 0.16 | 0.02 | 0.02 | 1.1 |

(unit: weight %)

EXAMPLE 5

Comparison of acetone soluble component.

Amount of light component (unreact ratio, unvulcanized NBR) in rubber glove: based on JISK6299 (method for quantitative analysis of solvent extract of rubber). Extracted by acetone solvent using Soxhlet extractor for 24 hours and calculated. Qualitative analysis of acetone extract is carried out by Infrared spectroscopy (FT-IR) analyzer.

As a measuring apparatus of FT-IR, IRP Prestage-21/FTIR-8400S of Shimadzu Seisakusho Co., Ltd., is used. Measuring method is transmission method (diamond cell is used) and numbers of integration is 40.

Swelling ratio of a specimen from rubber glove is carried out as follows. The specimen is dipped into toluene solvent, and weight increase (as a method to measure vulcanization state simply following method is generally used. That is, when a specimen is dipped into good solvent of vulcanized rubber, in a case of crosslinked polymer e.g. vulcanized rubber, the specimen is suppressed by elasticity of network and reaches to swelling equilibrium state. Vulcanization density of vulcanized rubber is in reverse proportional relationship with equilibrium swelling ratio) after 72 hours is measured at ordinary temperature, weight swelling ratio of each specimen (weight of specimen after swelling×100/weight of specimen before swelling, unit: %) is calculated, and this value is crosslinking density of vulcanized rubber.

Acetone soluble component of glove of the present invention is; 11.3 weight %, 12.0 weight %, 10.5-15 weight % and that of conventional Verte 710N (KLT-C) is 7.7 weight %.

Weight swelling ratio of glove of the present invention is 340%, and that of conventional Verte 710N (KLT-C) is 374% (Table 6).

From IR analysis results of acetone soluble component, presence of unreacted nitrilebutadiens is detected.

In the case of the present invention, absorption peak of carboxylic acid group is detected at closely to 1700 $cm^{-1}$.

In Table 4, results of metal elements analysis are recorded. Said analysis is carried out at surface and reverse surface of the third finger position of the glove.

TABLE 6

| specimen | Mooney viscosity of elastomer | *non-reaction ratio | wt. swelling ratio | position | method | C | O | Al | Si | S | Cl | K | Ca | Ti | Zn | Na | Total wt. % |
|---|---|---|---|---|---|---|---|---|---|---|---|---|---|---|---|---|---|
| Lot 1 | 140 | 8.1 | 287 | A | EDX | 83.4 | 3.9 | 0.1 | 1.0 | | | | 5.2 | 3.9 | | 0.4 | 100 |
| | | | | B | EDX | 75.8 | 3.5 | | | 0.8 | 11.9 | 0.2 | 3.2 | 1.6 | 2.6 | 0.4 | 100 |
| | | | | C | ICP | | | | | 0.46 | | | | | 0.79 | | 1.3 |
| Lot 2 | 180 | 4.5 | 249 | A | EDX | 87.2 | 1.9 | | | 0.8 | 2.6 | | 3.7 | 1.0 | 2.8 | | 100 |
| | | | | B | EDX | 86.6 | 3.0 | | | 0.8 | 4.1 | | 2.0 | 0.9 | 2.6 | | 100 |
| | | | | C | ICP | | | | | 0.40 | | | | | 0.83 | | 1.2 |
| Lot 3 | 190 | 8.0 | 281 | A | EDX | 84.0 | 1.9 | | | 1.2 | | | 4.4 | 3.7 | 4.4 | 0.4 | 100 |
| | | | | B | EDX | 76.0 | 2.8 | | | 0.8 | 12.3 | | 3.3 | 2.0 | 2.4 | 0.4 | 100 |
| | | | | C | ICP | | | | | 0.38 | | | | | 0.71 | | 1.1 |

TABLE 6-continued

| specimen | Mooney viscosity of elastomer | *non-reaction ratio | wt. swelling ratio | position | method | \multicolumn{11}{c}{analysis of elements} |
|---|---|---|---|---|---|---|---|---|---|---|---|---|---|---|---|---|---|
| | | | | | | C | O | Al | Si | S | Cl | K | Ca | Ti | Zn | Na | Total wt. % |
| Lot 4 | 220 | 9.9 | 317 | A | EDX | 84.3 | 4.8 | | | 1.0 | | | 5.1 | 1.9 | 2.6 | 0.3 | 100 |
| | | | | B | EDX | 75.3 | 3.5 | | | 0.9 | 12.6 | 0.2 | 3.7 | 1.6 | 2.1 | 0.1 | 100 |
| | | | | C | ICP | | | | | 0.45 | | | | | 0.6 | | 1.1 |
| on the market 1 | | 4.6 | 241 | A | EDX | 81.4 | 6.0 | | | 1.8 | | | 3.4 | 5.0 | 1.9 | 0.5 | 100 |
| | | | | B | EDX | 77.0 | 5.9 | 0.1 | | 1.9 | 6.5 | | 1.2 | 5.2 | 1.8 | 0.4 | 100 |
| | | | | C | ICP | | | | | 1.05 | | | | | 1.35 | | 2.4 |
| on the market 2 | | 80 | 6.5 | 309 | A | EDX | 87.3 | 1.7 | | | 3.0 | | | 1.4 | 2.5 | 3.6 | 0.3 | 100 |
| | | | | B | EDX | 83.7 | 3.4 | | 0.1 | 2.4 | 5.9 | | 1.0 | 1.8 | 1.5 | 0.3 | 100 |
| | | | | C | ICP | | | | | 1.06 | | | | | 1.07 | | 2.1 |
| on the market 3 | | 6.8 | 319 | A | EDX | 81.5 | 3.6 | 0.1 | 0.1 | 4.2 | | | 0.4 | 4.1 | 2.4 | 3.3 | 0.4 | 100 |
| | | | | B | EDX | 74.7 | 4.6 | | | 2.5 | 10.7 | 0.1 | 2.5 | 2.1 | 2.3 | 0.4 | 100 |
| | | | | C | ICP | | | | | 1.47 | | | | | 1.14 | | 2.6 |

*acetone soluble component
A: outer surface of glove
B: inner surface of glove
C: whole part of glove

EXAMPLE 6

Tensile test is carried out on a latex glove of mixture of acrylonitrile-butadiene to which methacrylic acid is added which is prepared by further adding methacrylic acid to acrylonitrile-butadiene to which previously mathacrylic acid is added or not added and a conventional glove of carboxylated nitrile latex prepared by conventional crosslinking method which uses sulfur and a vulcanizing accelerator along with ASTM-6319-00 testing method.

Each glove is hardened at 150° C. A glove to be tested is matured for 24 hours under condition of 50% humidity and 23° C. temperature. Regarding the glove, it is matured for 7 days under temperature condition of 70° C.

Results of physical properties measuring test of hardened and matured glove of the present invention are shown in Table 7. Regarding conventional glove is hardened at 150° C. A glove to be tested is matured for 24 hours under condition of 50% humidity and 23° C. temperature. Regarding the glove, it is matured for 7 days under temperature condition of 70° C. Results of physical properties of the glove are shown in Table 8.

TABLE 7

Physical properties of a glove of the present invention

| hardening temperature | 150° C. | 150° C. matured at 70° C. for 7 days |
|---|---|---|
| tension (MPa) | 26 | 34 |
| elongation (%) | 620 | 590 |
| elastic modulus 500% (MPa) | 9.8 | 12.6 |

TABLE 8

Physical properties of a conventional glove

| hardening temperature | 150° C. | 150° C. matured at 70° C. for 7 days |
|---|---|---|
| tension (MPa) | 26 | 26 |
| elongation (%) | 600 | 620 |
| elastic modulus 500% (MPa) | 12.3 | 10.6 |

Tension of the glove of the present invention is almost same as to that of conventional glove prepared by crosslinking method using ZnO (1.5 weight %) and sulfur (1.0 weight %).

Regarding elongation, glove of the present invention is larger than that of conventional glove.

Regarding the properties after matured, the glove of the present invention is better than that of conventional glove.

Composition of latex will be illustrated again. Regarding the latex composition of the mixture of acrylonitrile-butadiene to which methacrylic acid is added which is prepared by further adding methacrylic acid to acrylonitrile-butadiene to which previously mathacrylic acid is added or not added, adjust a pH from 9 to 10, and regulate contents of solid phase to be 18-30 weight % by water.

Gloves prepared using recipe of composition in Table 1 and by above mentioned process, is excellent in following points.
Advantage 1: Protect against I type hypersensitivity which causes immediately Product prepared according to the present invention does not use natural rubber which causes I type hypersensitivity originated by presence of protein contained in latex.
Advantage 2: Protect against IV type hypersensitivity which causes delayed IV type hypersensitivity is caused by using a vulcanizing accelerator containing tiuram, dithiocarbamate and mercaptobenzothiazole. In the present invention, a vulcanizing accelerator which causes IV type hypersensitivity after used by delay is not used.
Advantage 3: Being excellent at physical and chemical properties.

The recipe of latex in Table 1 provides with latex system which has good film property. Accordingly, the preparation of gloves of very thin film and having excellent barrier property can be possible. Size of gloves are shown below. It is clearly understood that the prepared gloves is thinner than conventional gloves (Table 9).

Physical properties are shown in Table 10. Tension at breaking and elongation of the gloves of the present invention are similar or higher than that of conventional gloves.

TABLE 9

| | thickness (wall of one layer) (mm) | | | |
|---|---|---|---|---|
| unit | thumb | palm | cuff | length of glove (mm) |
| 4.5 gm | 0.12-0.13 | 0.08-0.09 | 0.06-0.07 | 245-250 |
| 3.5 gm | 0.10-0.11 | 0.07-0.08 | 0.05-0.06 | 245-250 |

TABLE 10

|  |  | mass of glove | |
|---|---|---|---|
|  |  | 4.5 gm | 3.5 gm |
| tension (MPa) | just after the preparation | 20-35 | 20-35 |
|  | 3 weeks after the preparation | 21-35 | 21-35 |
| elongation (%) | just after the preparation | 585-620 | 580-620 |
|  | 3 weeks after the preparation | 585-620 | 580-620 |
| breaking strength | just after the preparation | 9.1-10.0 | 6.0-6.5 |
|  | 3 weeks after the preparation | 9.0-9.8 | 5.8-6.2 |

EXAMPLE 7

In Example 1, although sulfur as a crosslinking agent and vulcanizing accelerator are not used, Dermal sensitization study, which evaluates latent ability not to drag out immunocompatent against delayed IVtype hypersensitivity caused when the product of the present invention is contacted with skin. Delayed IVtype hypersensitivity is mainly caused by chemical compound such as accelerator used in conventional crosslinking method. In the method applied in this method, among CFR title 21, 50, 56 and 302 are adopted.

The purpose of this test is to determine change and/or susceptibility of human skin observed by repeating patch tests. The test is performed on 220 subjects (35 men and 185 women).

The test is carried out by two phases. Regarding test phase at introduction, a film specimen of glove of 1 inch square is placed on the surface of occlusive medical tape product of 3M. Patches are stuck on back between shoulder and waist. Tests are continued every Monday, Wednesday and Friday until 9 items of tests are performed. After 24 hours from sticking, all patches are removed. 24 hours rest is given on Tuesday and Thursday and after removal of patch on Saturday, 48 hours rest is given. Before next patch test, items returned by trained subjects are recorded.

After tests at introduction are over, device used for test is removed, and test is not carried out another 2 weeks. Re-challenge test is carried out after this 2 weeks rest. The re-challenge test is performed on new position. After removal, the position is observed and recorded at 24 hours and 72 hours. At the step when final observation is over, subjects are requested to report all variations and delayed variations caused on skin.

Variations caused on skin are recorded according to following standard (Table 11).

TABLE 11

| mark | opinion |
|---|---|
| 0 | no evidence to be affected |
| + | barely observed (minimum, slightly, not uniform, dotted erythema) |
| 1 | moderate (pink, un-uniform erythema covering almost whole part of contacted part) |
| 2 | medium (pink or red un-uniform erythema covering whole part of contacted part) |
| 3 | remarkable (bright red erythema accompanying or not accompanying petechiac or papule) |
| 4 | serious (deep red erythema accompanying vesiculation or defluxio of aqueous liquor) |

Testing results obtained from 220 subjects are summarized in Table 12. Any items do not mean illness. Several items (total 6 items) do not continue by end of test. Regarding glove prepared according to Example 1, there is no evidence to indicate disease of skin which becomes medical problem or allergic symptom caused by contact with human. This is resulted by meeting to latent care which indicates disease of skin of lower FDA.

TABLE 12

|  | introduction step numbers of estimation | | | | | | | | | final step numbers of estimation | |
|---|---|---|---|---|---|---|---|---|---|---|---|
|  | 1 | 2 | 3 | 4 | 5 | 6 | 7 | 8 | 9 | 24 hr | 72 hr |
| 0 | 220 | 220 | 220 | 220 | 220 | 218 | 216 | 216 | 216 | 214 | 214 |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 |

EXAMPLE 8

Skin-Sensitize Test (Maximization Test)

This test is carried out by Juridical Foundation "Food and Medicine Safety Center" (Hatano-shi, Kanagawa) based on "Basic view about biological safety test necessary for petition of recognition of production (import) of medical device" (13.02.2003, Consideration of Medicine No. 0213001" and "Reference materials regarding basic view of biological safety test" (19.03.2003, Examination of medical device No. 36).

1. Analyte

Verte Kimax $7^{th}$ Sense (shortened: $7^{th}$ Sense, Materials: nitrile rubber, lot No.PB30061114103022) which is analyte is a gloves of blue color and provided by Midori Anzen Co., Ltd., and maintained in the place where evades irradiation of direct sunshine or high temperature under room temperature.

2. Product for Comparison

Verte 710N (shortened: 710N, Materials: nitrile rubber, lot No. 0104170) is a gloves of blue color and provided by Midori Anzen Co., Ltd., and maintained in the place where evades irradiation of direct sunshine or high temperature in room of 10-40° C. temperature.

3. Details of Experiment

Using methanol extraction of Verte Kimax $7^{th}$ Sense, biological safety evaluation is obtained. And aiming to compare with Verte 710N, skin-sensitize test (maximization test) is carried out on a guinea pig using methanol extraction of Verte Kimax $7^{th}$ Sense.

At the preparation of prescribing subject, methanol extract of Verte Kimax $7^{th}$ Sense (hereinafter, shortened to $7^{th}$ Sense-M) or methanol extract of Verte 710N (hereinafter, shortened to 710N-M) is suspended in ethanol by proportion of 1 mL to the extract obtained 1 g of analyte used for extraction, and 100 v/v % 7$^{th}$ Sense-M ethanol suspension and 100 v/v % 710N-M ethanol suspension are obtained. Further, BLANK obtained from methanol alone is poured into same amount of ethanol as used at the preparation of suspension of 7th Sense-M or 710N-M and 100 v/v % blank suspensions are prepared. In first skin-sensitize test, 100 v/v % 7$^{th}$ Sense-M ethanol suspension and 100 v/v % 710N-M ethanol suspension are replaced with same amount of olive oil, and 100 v/v % 7$^{th}$ Sense-M olive oil suspension and 100 v/v % 710N-M olive oil suspension are prepared. In second skin-sensitize test, 100 v/v % 7$^{th}$ Sense-M ethanol suspension and 100 v/v % 710N-M ethanol suspension are replaced with same amount of olive oil, and 100 v/v % 7$^{th}$ Sense-M olive oil suspension and 100 v/v % 710N-M olive oil suspension are prepared. In causing, 100 v/v % 7$^{th}$ Sense-M ethanol suspension and 100 v/v % 710N-M ethanol suspension are prepared by adding ethanol as stepwise. Further, 100 v/v % corresponding volume blank ethanol solution is used as is.

In first skin-sensitize test (treatment first day) 10 v/v % 7$^{th}$ Sense-M olive oil suspension or 10 v/v % 710N-M olive oil suspension and Freund's complete adjuvant are injected by intradermal injection in upper part of shoulder bone of a guinea pig. At 7 days after treatment, 10 v/v % sodium lauryl sulfate is open spread on region including intradermal injection part, and next day (8 days after treatment) 100 v/v % 7$^{th}$ Sense-M olive oil suspension or 100 v/v % 710N-M olive oil suspension is blockage patched to same region as second skin-sensitize test for 48 hours. In causing (22 days after treatment), 100, 20, 4, 0.8, and 0.16 v/v % ethanol suspension of 7$^{th}$ Sense-M or 710N-M and 100 v/v % corresponding volume BLANK ethanol solution are blockage patched for 24 hours.

Conclusion of Experiment

Judgment is done according to judgment standard of Draize method after 24 hours and 48 hours from removal of patches. According to the results, positive reaction (erythema) is observed on 100 and 20 v/v % of 7$^{th}$ Sense-M prescribed group, and 100, 20, 4 and 0.8 v/v % of 710N-M prescribed group.

From above mentioned results, namely, 7$^{th}$ Sense-M and 710N-M indicate positive reaction, following conclusion is obtained. That is, under above mentioned test condition, Verte Kimax 7$^{th}$ Sense and Verte 710N-M indicate skin-sensitize against guinea pig, and minimum causing concentration is in case of Verte Kimax 7$^{th}$ Sense is 20 v/v % and in case of Verte 710N-M is 0.8 v/v % as the extracted solution.

In gloves of the present invention, Verte Kimax 7$^{th}$ Sense indicates positive reaction at high concentration of 20 v/v %, and Verte 710N-M indicates positive reaction at 0.8 v/v %.

For the purpose to obtain biological safety evaluation and to compare with Verte 710N-M, skin-sensitize test (maximization test) is carried out using methanol extract of Verte Kimax 7$^{th}$ Sense on a guinea pig.

Results are summarized in Tables.
Results by Weight of Individuals

TABLE 13A

| group | subject No. | starting date of previous test | first day | 8$^{th}$ day | 15$^{th}$ day | 22$^{nd}$ day | 25$^{th}$ day |
|---|---|---|---|---|---|---|---|
| I 7$^{th}$ SenthM | 1-1 | 348 | 392 | 428 | 481 | 515 | 513 |
| | 1-2 | 350 | 386 | 392 | 437 | 490 | 492 |
| | 1-3 | 361 | 401 | 459 | 499 | 534 | 535 |
| | 1-4 | 342 | 377 | 429 | 471 | 503 | 514 |

TABLE 13A-continued

| group | subject No. | starting date of previous test | first day | 8$^{th}$ day | 15$^{th}$ day | 22$^{nd}$ day | 25$^{th}$ day |
|---|---|---|---|---|---|---|---|
| | 1-5 | 383 | 446 | 502 | 555 | 601 | 595 |
| | 1-6 | 355 | 401 | 449 | 510 | 541 | 554 |
| | 1-7 | 332 | 367 | 402 | 448 | 462 | 466 |
| | 1-8 | 350 | 393 | 449 | 504 | 537 | 552 |
| | 1-9 | 348 | 378 | 435 | 461 | 498 | 518 |
| | 1-10 | 339 | 377 | 399 | 426 | 447 | 439 |
| | average | 351 | 392 | 434 | 479 | 513 | 518 |
| | standard deviation | ±14 | ±22 | ±33 | ±39 | ±44 | ±45 |
| II comparison (710N-M) | II-1 | 372 | 403 | 438 | 470 | 500 | 485 |
| | II-2 | 323 | 361 | 393 | 442 | 469 | 464 |
| | II-3 | 343 | 374 | 419 | 464 | 498 | 485 |
| | II-4 | 343 | 380 | 409 | 435 | 473 | 482 |
| | II-5 | 359 | 391 | 439 | 448 | 499 | 493 |
| | II-6 | 342 | 362 | 388 | 415 | 432 | 436 |
| | II-7 | 350 | 402 | 462 | 489 | 535 | 534 |
| | II-8 | 360 | 405 | 430 | 468 | 513 | 501 |
| | II-9 | 343 | 396 | 436 | 454 | 482 | 492 |
| | II-10 | 334 | 377 | 428 | 447 | 487 | 486 |
| | average | 347 | 385 | 424 | 453 | 489 | 486 |
| | standard deviation | ±14 | ±17 | ±23 | ±21 | ±28 | ±25 |

TABLE 13B

| group | subject No. | starting date of previous test | first day | 8$^{th}$ day | 15$^{th}$ day | 22$^{nd}$ day | 25$^{th}$ day |
|---|---|---|---|---|---|---|---|
| III negative comparison (BLANK) | III-1 | 363 | 415 | 473 | 503 | 555 | 560 |
| | III-2 | 345 | 387 | 425 | 458 | 498 | 495 |
| | III-3 | 382 | 443 | 472 | 495 | 539 | 529 |
| | III-4 | 354 | 401 | 442 | 481 | 525 | 541 |
| | III-5 | 333 | 368 | 390 | 407 | 443 | 438 |
| | average | 355 | 403 | 440 | 468 | 512 | 513 |
| | standard deviation | ±19 | ±28 | ±35 | ±39 | ±44 | ±48 |
| IV positive comparison (DNCB) | IV-1 | 356 | 430 | 472 | 521 | 572 | 590 |
| | IV-2 | 333 | 375 | 420 | 426 | 485 | 481 |
| | IV-3 | 354 | 396 | 444 | 470 | 521 | 533 |
| | IV-4 | 369 | 416 | 453 | 496 | 536 | 544 |
| | IV-5 | 344 | 395 | 440 | 485 | 529 | 541 |
| | average | 349 | 402 | 446 | 480 | 529 | 538 |
| | standard deviation | ±11 | ±21 | ±19 | ±35 | ±31 | ±39 |

DNCB: 1-chloro-2,4-dinitrobenzene

Results by Groups

TABLE 14

| group discrimination | sensitize substance | | | causing substance | | judge after removal of patch | | | |
|---|---|---|---|---|---|---|---|---|---|
| | | conc. (v/v %) | | | | 24 hrs. | | 48 hrs. | |
| | substance | 1st | 2nd | substance | conc. (v/v %) | positive ratio | ave. eval. | positive ratio | ave. eval. |
| I 7th SenseM | 7th Sense M | 10 | 100 | 7th Sense M | 100 | 100 | 1.7 | 90 | 1.6 |
| | | | | | 20 | 80 | 0.9 | 80 | 0.9 |
| | | | | | 4 | 0 | 0.0 | 0 | 0.0 |
| | | | | | 0.8 | 0 | 0.0 | 0 | 0.0 |
| | | | | | 0.16 | 0 | 0.0 | 0 | 0.0 |
| | | | | blank | 0* | 0 | 0.0 | 0 | 0.0 |
| II comparison (710N-M) | 710N-M | 10 | 100 | 710N-M | 100 | 100 | 1.6 | 100 | 1.7 |
| | | | | | 20 | 100 | 1.4 | 90 | 1.4 |
| | | | | | 4 | 50 | 0.5 | 50 | 0.5 |
| | | | | | 0.8 | 20 | 0.2 | 20 | 0.2 |
| | | | | | 0.16 | 0 | 0.0 | 0 | 0.0 |
| | | | | blank | 0* | 0 | 0.0 | 0 | 0.0 |
| III negative comparison (BLANK) | blank | 10 | 100 | 7th Sense M | 100 | 40 | 0.4 | 40 | 0.4 |
| | | | | | 20 | 0 | 0.0 | 0 | 0.0 |
| | | | | | 4 | 0 | 0.0 | 0 | 0.0 |
| | | | | blank | 0* | 0 | 0.0 | 0 | 0.0 |
| | | | | 710N-M | 100 | 60 | 0.6 | 60 | 0.6 |
| | | | | | 20 | 0 | 0.0 | 0 | 0.0 |
| | | | | | 4 | 0 | 0.0 | 0 | 0.0 |
| IV positive comparison (DNCB) | DNCB 0.1 w/v % | | 0.1 | DNCB 0.1 w/v % | 0.1 | 100 | 4.8 | 100 | 5.2 |
| | | | | | 0.01 | 100 | 3.8 | 100 | 4.0 |
| | | | | | — | 0 | 0.0 | 0 | 0.0 | positive ratio: Nos. of positive animals in group/Nos. of animals in group
ave. eval.: average of evaluation point
: total of evaluation point of group/numbers of animals in group
DNCB: 1-chloro-2,4-dinitrobenzene
Medium (sensitize substance): olive oil (7th Sense-M, 710N-M, Blank, DNCB)
Medium (causing substance): ethanol (7th Sense-M, 710N-M, Blank, DNCB)
*100 v/v % corresponding volume BLANK ethanol solution Results after Patches are Removed

TABLE 15

| | | | causing substance | | | | | | | | | |
|---|---|---|---|---|---|---|---|---|---|---|---|---|
| | | | 7th Sense-M | | | | | | | | | blank |
| | | | 100 v/v % | | 20 v/v % | | 4 v/v % | | 0.8 v/v % | | 0.16 v/v % | | 100 v/v % | |
| group | judge time | animal number | ① | ② | ① | ② | ① | ② | ① | ② | ① | ② | ① | ② |
| I | 24 hrs. | I-1 | 1 | 0 | 1 | 0 | 0 | 0 | 0 | 0 | 0 | 0 | 0 | 0 |
| | | I-2 | 2 | 0 | 1 | 0 | 0 | 0 | 0 | 0 | 0 | 0 | 0 | 0 |
| | | I-3 | 2 | 0 | 1 | 0 | 0 | 0 | 0 | 0 | 0 | 0 | 0 | 0 |
| | | I-4 | 1 | 0 | 1 | 0 | 0 | 0 | 0 | 0 | 0 | 0 | 0 | 0 |
| | | I-5 | 2 | 0 | 1 | 0 | 0 | 0 | 0 | 0 | 0 | 0 | 0 | 0 |
| | | I-6 | 2 | 0 | 1 | 0 | 0 | 0 | 0 | 0 | 0 | 0 | 0 | 0 |
| | | I-7 | 2 | 0 | 2 | 0 | 0 | 0 | 0 | 0 | 0 | 0 | 0 | 0 |
| | | I-8 | 1 | 0 | 0 | 0 | 0 | 0 | 0 | 0 | 0 | 0 | 0 | 0 |
| | | I-9 | 2 | 0 | 0 | 0 | 0 | 0 | 0 | 0 | 0 | 0 | 0 | 0 |
| | | I-10 | 2 | 0 | 1 | 0 | 0 | 0 | 0 | 0 | 0 | 0 | 0 | 0 |
| | | positive ratio | 100 | | 80 | | 0 | | 0 | | 0 | | 0 | |
| | | av. eval. | 1.7 | | 0.9 | | 0.0 | | 0.0 | | 0.0 | | 0.0 | |
| 7th Sense-M | 48 hrs. | I-1 | 1 | 0 | 1 | 0 | 0 | 0 | 0 | 0 | 0 | 0 | 0 | 0 |
| | | I-2 | 2 | 0 | 1 | 0 | 0 | 0 | 0 | 0 | 0 | 0 | 0 | 0 |
| | | I-3 | 2 | 0 | 1 | 0 | 0 | 0 | 0 | 0 | 0 | 0 | 0 | 0 |
| | | I-4 | 1 | 0 | 1 | 0 | 0 | 0 | 0 | 0 | 0 | 0 | 0 | 0 |
| | | I-5 | 2 | 0 | 1 | 0 | 0 | 0 | 0 | 0 | 0 | 0 | 0 | 0 |
| | | I-6 | 2 | 0 | 1 | 0 | 0 | 0 | 0 | 0 | 0 | 0 | 0 | 0 |

TABLE 15-continued

| | | | causing substance | | | | | | | | | | |
|---|---|---|---|---|---|---|---|---|---|---|---|---|---|
| | | | 7th Sense-M | | | | | | | | | | blank |
| | judge | animal | 100 v/v % | | 20 v/v % | | 4 v/v % | | 0.8 v/v % | | 0.16 v/v % | | 100 v/v % |
| group | time | number | ① | ② | ① | ② | ① | ② | ① | ② | ① | ② | ① | ② |
| | | I-7 | 2 | 0 | 2 | 0 | 0 | 0 | 0 | 0 | 0 | 0 | 0 | 0 |
| | | I-8 | 0 | 0 | 0 | 0 | 0 | 0 | 0 | 0 | 0 | 0 | 0 | 0 |
| | | I-9 | 2 | 0 | 0 | 0 | 0 | 0 | 0 | 0 | 0 | 0 | 0 | 0 |
| | | I-10 | 2 | 0 | 1 | 0 | 0 | 0 | 0 | 0 | 0 | 0 | 0 | 0 |
| | | positive ratio | 90 | | 80 | | 0 | | 0 | | 0 | | 0 | |
| | | ave. eval. | 1.5 | | 0.9 | | 0.0 | | 0.0 | | 0.0 | | 0.0 | |

① erythema
② edema

Standard for Judgment

| | Evaluation point |
|---|---|
| Forming of erythema and crust (erythema) | |
| Erythema is not observed | 0 |
| Very light erythema (barely ovserved) | 1 |
| Distinctive erythema | 2 |
| Medium or remarkable erythema | 3 |
| Small crust is formed from remarkable erythema | 4 |
| Forming of edema | |
| Not formed | 0 |
| Very light edema (barely observed) | 1 |
| Light edema (distinctive edge by clear torus) | 2 |

| | Evaluation point |
|---|---|
| Medium edema (torus of 1 mm around) | 3 |
| Remarkable (torus over than 1 mm and extension beyond exposure region) | 4 |

Positive ratio:
(numbers of positive animal in group/numbers of animal in group)×100 ave. eval.: averaged evaluated point:
total of evaluated point of group/numbers of animal in group Results by Individuals after Removal of Patch

TABLE 16

| | | | causing substance | | | | | | | | | | |
|---|---|---|---|---|---|---|---|---|---|---|---|---|---|
| | | | 710N-M | | | | | | | | | | blank |
| | judge | animal | 100 v/v % | | 20 v/v % | | 4 v/v % | | 0.8 v/v % | | 0.16 v/v % | | 100 v/v % |
| group | time | number | ① | ② | ① | ② | ① | ② | ① | ② | ① | ② | ① | ② |
| II comparison 710N-M | 24 hrs. | II-1 | 2 | 0 | 2 | 0 | 0 | 0 | 0 | 0 | 0 | 0 | 0 | 0 |
| | | II-2 | 1 | 0 | 1 | 0 | 1 | 0 | 0 | 0 | 0 | 0 | 0 | 0 |
| | | II-3 | 2 | 0 | 1 | 0 | 1 | 0 | 1 | 0 | 0 | 0 | 0 | 0 |
| | | II-4 | 1 | 0 | 1 | 0 | 0 | 0 | 0 | 0 | 0 | 0 | 0 | 0 |
| | | II-5 | 2 | 0 | 2 | 0 | 1 | 0 | 0 | 0 | 0 | 0 | 0 | 0 |
| | | II-6 | 1 | 0 | 1 | 0 | 0 | 0 | 0 | 0 | 0 | 0 | 0 | 0 |
| | | II-7 | 2 | 0 | 2 | 0 | 1 | 0 | 1 | 0 | 0 | 0 | 0 | 0 |
| | | II-8 | 2 | 0 | 1 | 0 | 1 | 0 | 0 | 0 | 0 | 0 | 0 | 0 |
| | | II-9 | 2 | 0 | 2 | 0 | 0 | 0 | 0 | 0 | 0 | 0 | 0 | 0 |
| | | II-10 | 1 | 0 | 1 | 0 | 0 | 0 | 0 | 0 | 0 | 0 | 0 | 0 |
| | | positive ratio | 100 | | 100 | | 50 | | 20 | | 0 | | 0 | |
| | | ave. eval. | 1.6 | | 1.4 | | 0.5 | | 0.2 | | 0.0 | | 0.0 | |
| | 48 hrs. | II-1 | 2 | 0 | 2 | 0 | 0 | 0 | 0 | 0 | 0 | 0 | 0 | 0 |
| | | II-2 | 1 | 0 | 1 | 0 | 1 | 0 | 0 | 0 | 0 | 0 | 0 | 0 |
| | | II-3 | 2 | 0 | 2 | 0 | 1 | 0 | 1 | 0 | 0 | 0 | 0 | 0 |
| | | II-4 | 2 | 0 | 1 | 0 | 0 | 0 | 0 | 0 | 0 | 0 | 0 | 0 |
| | | II-5 | 2 | 0 | 2 | 0 | 1 | 0 | 0 | 0 | 0 | 0 | 0 | 0 |
| | | II-6 | 1 | 0 | 0 | 0 | 0 | 0 | 0 | 0 | 0 | 0 | 0 | 0 |
| | | II-7 | 2 | 0 | 2 | 0 | 1 | 0 | 1 | 0 | 0 | 0 | 0 | 0 |
| | | II-8 | 2 | 0 | 1 | 0 | 1 | 0 | 0 | 0 | 0 | 0 | 0 | 0 |
| | | II-9 | 2 | 0 | 2 | 0 | 0 | 0 | 0 | 0 | 0 | 0 | 0 | 0 |
| | | II-10 | 1 | 0 | 1 | 0 | 0 | 0 | 0 | 0 | 0 | 0 | 0 | 0 |
| | | positive ratio | 100 | | 90 | | 50 | | 20 | | 0 | | 0 | |
| | | ave. eval. | 1.7 | | 1.4 | | 0.5 | | 0.2 | | 0.0 | | 0.0 | |

① erythema
② edema

Results by Individuals after Removal of Patch (2)

TABLE 17

| | | | causing substance | | | | | | | | | | | | | |
|---|---|---|---|---|---|---|---|---|---|---|---|---|---|---|---|---|
| | | | 7th Sense-M | | | | | | blank | | 710N-M | | | | | |
| | judge | animal | 100 v/v % | | 20 v/v % | | 4 v/v % | | 100 v/v % | | 100 v/v % | | 20 v/v % | | 4 v/v % | |
| group | time | number | ① | ② | ① | ② | ① | ② | ① | ② | ① | ② | ① | ② | ① | ② |
| III negative comparison (blank) | 24 hrs. | III-1 | 0 | 0 | 0 | 0 | 0 | 0 | 0 | 0 | 0 | 0 | 0 | 0 | 0 | 0 |
| | | III-2 | 0 | 0 | 0 | 0 | 0 | 0 | 0 | 0 | 1 | 0 | 0 | 0 | 0 | 0 |
| | | III-3 | 1 | 0 | 0 | 0 | 0 | 0 | 0 | 0 | 1 | 0 | 0 | 0 | 0 | 0 |
| | | III-4 | 1 | 0 | 0 | 0 | 0 | 0 | 0 | 0 | 0 | 0 | 0 | 0 | 0 | 0 |
| | | III-5 | 0 | 0 | 0 | 0 | 0 | 0 | 0 | 0 | 1 | 0 | 0 | 0 | 0 | 0 |
| | | positive ratio | 40 | | 0 | | 0 | | 0 | | 60 | | 0 | | 0 | |
| | | average eval. | 0.4 | | 0.0 | | 0.0 | | 0.0 | | 0.6 | | 0.0 | | 0.0 | |
| | 48 hrs. | III-1 | 0 | 0 | 0 | 0 | 0 | 0 | 0 | 0 | 0 | 0 | 0 | 0 | 0 | 0 |
| | | III-2 | 0 | 0 | 0 | 0 | 0 | 0 | 0 | 0 | 1 | 0 | 0 | 0 | 0 | 0 |
| | | III-3 | 1 | 0 | 0 | 0 | 0 | 0 | 0 | 0 | 1 | 0 | 0 | 0 | 0 | 0 |
| | | III-4 | 1 | 0 | 0 | 0 | 0 | 0 | 0 | 0 | 0 | 0 | 0 | 0 | 0 | 0 |
| | | III-5 | 0 | 0 | 0 | 0 | 0 | 0 | 0 | 0 | 1 | 0 | 0 | 0 | 0 | 0 |
| | | positive ratio | 40 | | 0 | | 0 | | 0 | | 60 | | 0 | | 0 | |
| | | average eval. | 0.4 | | 0.0 | | 0.0 | | 0.0 | | 0.6 | | 0.0 | | 0.0 | |

① erythema
② edema
Standard for judgment: refer to Table 3

Results by Individuals after Removal of Patch (3)

TABLE 18

| | | | causing substance | | | | | |
|---|---|---|---|---|---|---|---|---|
| | | | 0.1 w/v % DNCB | | 0.01 w/v % DNCB | | ethanol | |
| | judge | animal | ① | ② | ① | ② | ① | ② |
| group | time | number | | | | | | |
| IV positive comparison (DNCB) | 24 hrs. | IV-1 | 4 | 1 | 3 | 0 | 0 | 0 |
| | | IV-2 | 3 | 1 | 3 | 1 | 0 | 0 |
| | | IV-3 | 4 | 1 | 3 | 1 | 0 | 0 |
| | | IV-4 | 4 | 1 | 3 | 0 | 0 | 0 |
| | | IV-5 | 4 | 1 | 4 | 1 | 0 | 0 |
| | | positive ratio | 100 | | 100 | | 0 | |
| | | average eval. | 4.8 | | 3.8 | | 0.0 | |
| | 48 hrs. | IV-1 | 4 | 2 | 3 | 0 | 0 | 0 |
| | | IV-2 | 4 | 1 | 4 | 1 | 0 | 0 |
| | | IV-3 | 4 | 1 | 3 | 1 | 0 | 0 |
| | | IV-4 | 4 | 1 | 3 | 0 | 0 | 0 |
| | | IV-5 | 4 | 1 | 4 | 1 | 0 | 0 |
| | | positive ratio | 100 | | 100 | | 0 | |
| | | average eval. | 5.2 | | 4.0 | | 0.0 | |

① erythema
② edema
Standard for judgment: refer to Table 3
DNCB: 1-chloro-2,4-dinitrobenzene

EXAMPLE 9

Storage elastic modulus E', loss elastic modulus E" and loss tangent tan δ, which are dynamic viscoelasticity properties of specimens of the glove of the present invention and VERTE 710, which is conventional product, are measured by a viscoelastometer under tensile mode. Results are shown in Table 11. Master curve of dynamic viscoelasticity is calculated and shown in FIG. 5 and FIG. 6.

When compared with conventional product, the gloves of the present invention indicates good results.

From the results of storage elastic modulus E', loss elastic modulus E" and loss tangent tan δ, which are dynamic viscoelasticity properties of specimens of the glove of the present invention and VERTE 710, which is a conventional product, measured by a viscoelastometer under tensile mode, master curve of dynamic viscoelasticity is calculated and shown in FIG. 5. This curve indicate the results of the gloves of the present invention. In the case of the present invention, storage elastic modulus E', loss elastic modulus E" and loss tangent tan δ measured under tensile mode are good.

EXAMPLE 10

Analytical Results of Emulsion Material

746SXL of the present invention, conventional product 6322 and conventional product Nipol 550, which are emulsion material are heated and dried under vacuum condition at 80° C. for 8 hours and resin residue are weighted and solid parts in latex are calculated.

(1) NBR rubber solid component in each emulsion materials, when water part is removed under vacuum condition at 80° C., are 45-46% around.

(2) Analytical results of elements (C, H) in solid part of each latex specimen are almost same (C: 78-79%, H, 9.8-10.0 weight %. Nitrogen contents of Nipol 550 (originated from acrylonitrile) is relatively about 3% lower than other specimens by acryronitrile standard, however, every specimens are in the range of nitrile (amount of AN is 25-30%). In the meanwhile, amount of S originated from surfactant are 0.3-0.5 weight %.

(3) Amount of volatile unreated MMA monomer in 6322 is 13 ppm (upper drawing of FIG. 3 is a drawing showing amount of volatile unreated MMA monomer in conventional product).

Amount of volatile unreated MMA monomer in 746 SXL of the present invention is 370 ppm (lower drawing of FIG. 3 is a drawing showing amount of volatile unreated MMA monomer in the present invention).

EXAMPLE 11

Measuring Method of Mooney Viscosity

Mooney viscosity ($ML_{(1+4)}$(100° C.)) of an elastomer which is first step crosslink is over by adding methacrylic acid to acrylonitrile-butadiene by further adding methacrylic acid to acrylonitrile-butadiene to which previously mathacrylic acid is added or not added is 100-220. Measuring method of Mooney viscosity is regulated by JISK6300 and ASTM D1646.

Mooney viscosity is viscosity of rubber measured by Mooney plasticity meter (viscometer), graduation of meter is cut by Mooney unit and directly indicates Mooney viscosity. In general, a large rotor is used at 100° C., after 1 minute of previous heating, and the rotor is started to rotate and a value after 4 minutes is observed and indicated by ($ML_{(1+4)}$(100° C.)).

(a) At the measurement of Mooney viscosity, acrylonitrile-butadiene and methacrylic acid are added to 200 ml of mixed saturated aqueous solution of calcium nitrate and calcium carbonate. Unsaturated carboxylic acid (or mathacrylic acid) is reacted to butadiene part of acrylonitrile-butadiene and butadiene part of other acrylonitrile-butadiene. Latex, in which unsaturated carboxylic acid (or mathacrylic acid) is added to butadiene part so as to form a state having many branches, or forming a state that a part of unsaturated carboxylic acid (or mathacrylic acid) is added to butadiene part so as to form graft polymerization, is dropped by a pipette, stirred for 10 minutes (at 23° C., stirring speed is 500 rpm), then deposition of solid rubber is confirmed.

The obtained solid rubber is took out and washed by stirring with 1000 ml of ID water (at 23° C., stirring speed is 500 rpm). This washing operation is repeated 10 times.

This washed solid rubber is dehydrated by squeezing, further dried by vacuum at 60° C. for 72 hours.

In this state, a glove former mentioned below is dipped in a coagulant, coated, dried or partially dried at the temperature of 50-70° C. range, then dipped into latex prepared by recipe of the present invention. The glove former is dipped into the latex during specific time so as to coat the latex certainly on the surface of the glove former and is in the state of before drying. Mooney viscosity of the latex of not crosslinked state may be measured.

It is necessary to pay attention not to make the thickness of the glove becomes too thick. Dipping time of the glove former in latex is decided according to contents of total solid compound (TSC) of latex and desired thickness for coating. The dipping time is 1-20 seconds, desirably, from 12 to 17 seconds.

Under above mentioned condition, Mooney viscosity of not crosslined elastomer which is a polymer consisting of a mixture prepared by adding methacrylic acid to acrylonitrile-butadiene by further adding methacrylic acid to acrylonitrile-butadiene to which previously mathacrylic acid is added or not added is measured.

(b) Based on JIS K6300-1: 2001 (non-vulcanized rubber—physical property—first clause: Viscosity by Mooney viscometer and a method to decide scorching time), dried solid rubber part recovered from each latex is passed through between 8 inches rollers of 1.00 mm distance for 10 times and a specimen for test is prepared.

(c) Mooney viscosity ($ML_{(1+4)}$(100° C.)) of 746SXL of the present invention is 151, while, that of conventional 6322 is 122. According to previous measurement, they were respectively 180 and 128.

In general, NBR (acrylonitrile-butadiene) latex is a polymer characterized by partially co-polymerizing unsaturated carboxylic acid such as methacrylic acid.

Polymerization degree of said polymer can be measured by various methods, however, in a case not to be solved in organic solvent, Mooney viscosity becomes effective index. Since NBR (acrylonitrile-butadiene) latex to be used in the present invention can bond by covalent bond with 2 double bonds of butadiene by sulfur, the latex can perform a rubber elastomer characterized that the NBR (acrylonitrile-butadiene) latex is highly crosslinked. Further, zinc acts as bivalent metallic ion and crosslinks two unsaturated carboxylic acid and crosslink structure becomes more strong. However, in the present invention, since there is no crosslink structure by sulfur, intensity of rubber elastomer is supported by making molecular weight (degree of polymerization) of NBR latex higher, enmeshing or invading of NBR latex each other. Mooney viscosity of conventional NBR latex is about from 30 to 80, on the contrary, that of the present invention is from 100 to 220 and polymerization degree is higher than that of the conventional product.

Accordingly, when molecules of NBR latex of higher polymerization degree enmesh or invade each other, said phenomenon contributes largely to intensity. And, between NBR latexes which enmesh or invade each other, when partially copolymerized unsaturated carboxylic acid is cross linked by zinc, which is bivalent metallic ion, intensity of it becomes stronger.

In a case of NBR latex whose Mooney viscosity is smaller than 100, since length of molecule is short, effect of enmeshing or invading is small. When Mooney viscosity becomes larger than 220, molecule of NBR latex enmeshes by itself and engraving with other molecule of NBR latex becomes small, further degree of mutual invading of NBR latex becomes small. Further, regarding crosslink by zinc, probability to cause between unsaturated carboxylic acid in same NBR latex polymer becomes high, and phenomenon to crosslink plural NBR latex by zinc becomes small, therefore intensity is deteriorated and becomes to be easily cut.

From various experiments of the inventors, optimum value range of Mooney viscosity is from 100 to 220.

EXAMPLE 12

Measuring Method for Particle Size Distribution

Each latex solution is diluted to 0.02% around by DI water and dispersed by ultra sonic for 1 minutes, then particle size distribution is measured by following sub micron particle size measuring apparatus.

(condition for measurement of particle size)
Measuring apparatus: COULTER N4 PLUS
Liquid viscosity: 0.9333 cp
Temperature: 23° C.
Automatic SDP: 10 nm-1000 m
Angle selected: 90°

Previously measured particle size of 746 SXL latex of the present invention is, average particle size=168 nm, standard deviation is 28.9 nm (upper drawing of FIG. 4).

Particle size of 746 SXL latex of the present invention measured this time, average particle size=170 nm, standard deviation is 16 nm.

Previously measured particle size of 6322 latex, which is conventional product, is, average particle size=178 nm, standard deviation is 30.0 nm (lower drawing of FIG. 4). Particle size of 6322 latex, which is conventional product, measured this time is, average particle size=184 nm, standard deviation is 53 nm.

Particle size distribution of Nipol 550, which is conventional product, measured this time, average particle size=141 nm, standard deviation is 24 nm.

EXAMPLE 13

Analysis of Reactivity Evaluation of Latex Materials
(a) Test Method for Trial Preparation of Latex Containing ZnO After adding zinc oxide (ZnO) solution to each latex so as the amount of ZnO to solid part of latex to be 1.2 weight part converted to solid part, stirred in a sealing vessel at room temperature for 24 hours, then transferred to a glass vessel having flat bottom (height of liquid surface is 2 mm) and dried at 40° C. so as to obtain a film, then heat treated by prescribed temperature (150° C.) for 1 hour.
(b) Test Method for Trial Preparation of Latex not Containing ZnO Each latex is transferred to a glass vessel having flat bottom (height of liquid surface is 2 mm) and dried at 40° C., then heat treated by prescribed temperature (150° C.) for 1 hour.
(c) Method for Quantitative Analysis of Carboxylic Acid Amount of un-reacted carboxyl acid in latex solid part (resin film) is quantitatively analyzed as follows. Ratio of absorption peak intensity of carboxylic group originated to MMA and absorption peak intensity originated to acrylonitrile group, namely, "peak intensity of COOH group at 1699 $cm^{-1}$/peak intensity of CN group at 2235 $cm^{-1}$" of each latex solid part (resin film) obtained by dry treatment is measured using Infra Red spectrum and amount of un-reacted carboxyl acid in solid part (converted to PAA) is calculated using calibration curve (prepared from resin film prepared by adding 1-3% polyacrylic acid (PAA) based on solid part to 746 SXL latex).
(d) Analysis of Light Component (Un-Reacted NBR)

Amount of light component (un-reacted ratio, non vulcanized NBR) in latex materials film: Extracted by Soxhlet extraction using acetone solvent and measured based on JIS K6229 (method for quantitative analysis of rubber-extracted product).
(e) Measuring Method of Weight Swelling Ratio Swelling test of latex materials film is carried out by dipping a film in toluene solvent at room temperature and weight increase (in general, as a method to evaluate vulcanization state simply, following method is used. That is, when vulcanized rubber is dipped into good solvent, the good solvent acts to dissolve and expand polymer chain, but in a case of crosslinked polymer e.g. vulcanized rubber, it is suppressed by elasticity of network and reaches to swelling equilibrium state, and vulcanization density of vulcanized rubber is in reverse proportional relationship with equilibrium swelling ratio) after 72 hours is measured, and the weight swelling ratio of latex materials film is calculated. The weight swelling ratio indicates a crosslinking state of vulcanized rubber.

Above mentioned analysis results are summarized in Tables 19 and 20. Table 19 shows results about 40° C. dried specimens, and Table 20 shows results about 1 hour heat treated specimens at 150° C.

TABLE 19

| | | 746 SXL | | 6322 | | Nipol 550 | |
|---|---|---|---|---|---|---|---|
| 40° C. dried | | 746 SXL | 746 SXL + ZnO | 6322 | 6322 + ZnO | 550 | 550 + ZnO |
| carboxylic acid (wt. %) | Lot 1 | 4.07 | — | 4.01 | — | 3.76 | — |
| | Lot 2 | 4.15 | — | 4.36 | — | 3.73 | — |
| | ave. | 4.1 | — | 4.2 | — | 3.7 | — |
| acetone soluble component (wt. %) | Lot 1 | 33.7 | 32.4 | 32.6 | 31.8 | 89.9 | 98.7 |
| | Lot 2 | 27.4 | — | 33.2 | — | — | — |
| weight swelling ratio (%) | Lot 1 | 287 | 275 | 293 | 281 | 501 | 529 |
| | Lot 2 | 338 | — | 345 | — | — | — | adding amount of ZnO: 1.2 weight parts as solid parts

TABLE 20

| | | 746 SXL | | 6322 | | Nipol 550 | |
|---|---|---|---|---|---|---|---|
| 1 hour heat treated at 150° C. | | 746 SXL | 746 SXL + ZnO | 6322 | 6322 + ZnO | 550 | 550 + ZnO |
| carboxylic acid (wt. %) | Lot 1 | 5.07 | 0.41 | 4.17 | 0.24 | 3.29 | 0.0 |
| | Lot 2 | 4.54 | 0.22 | 4.33 | 0.19 | 3.01 | 0.0 |
| | ave. | 4.8 | 0.4 | 4.3 | 0.2 | 3.2 | 0.0 |
| acetone soluble component (wt. %) | Lot 1 | 26.9 | 14.2 | 22.8 | 7.6 | 52.1 | 47.7 |
| | Lot 2 | — | 13.4 | — | 13.8 | — | — |
| weight swelling ratio (%) | Lot 1 | 256 | 222 | 251 | 232 | 562 | 539 |
| | Lot 2 | — | 261 | — | 270 | — | — |
| reacting ratio (%) | Lot 1 | 0.0 (−17%) | 92 | 0.0 (−2%) | 95 | 14 | 100 |
| | Lot 2 | 0.0 | 93 | 8 | 84 | — | — |

1) adding amount of ZnO: 1.2 weight parts as solid parts
2) reacting ratio (%) = 100 × (40° C. dried product amount of carboxylic acid (wt %) − 1 hour heat treated at 150° C. amount of carboxylic acid (wt %)/40° C. dried product amount of carboxylic acid (wt %)

In 746 SXL of the present invention and 6322 which is conventional product, decrease of amount of carboxylic acid by heat drying is not observed when ZnO is not present. In case of Nipol 550, 10-20% of decrease of amount of carboxylic acid is observed.

As the next, when ZnO is added to 746 SXL of the present invention and 6322 which is conventional product, remarkable decrease of amount of carboxylic acid by heat treatment at 150° C. is observed, and tendency of the decrease (increase of reacting ratio) is more remarkable in 746 SXL. It is understand that crosslink is accelerated.

Amount of acetone soluble component (un-reacted NBR rubber) of 746 SXL in ZnO not added series of two lots are 33.7 weight % and 27.4 weight %, and in lot 1, decreased to 26.9% by one hour heat treatment at 150° C. On the contrary, in ZnO added series, amount of carboxylic acid group decreases remarkably from 32.4% to 14.2% by one hour heat treatment at 150° C. and crosslinking effect by zinc is observed.

Weight swelling ratio of 40° C. dried 746 SXL of ZnO non added series by two lots measuring results are 287% and 336% and indicates that the crosslinking density is relatively high. In a case of ZnO added series, same tendency is indicated.

Amount of acetone soluble component and weight swelling ratio of 6322 are almost same level as to those of 746 SXL.

In the case of Nipol 550, results are different from above mentioned cases. In 40° C. dried case, weight swelling ratio of ZnO not added series is 501% and ZnO added series is 529%, namely, both case are relatively high, and in one hour heat treatment at 150° C., weight swelling ratio is increased even if ZnO is added. These results indicate that in case of Nipol 550, film of high crosslinking density cannot be obtained without crosslinking treatment, further, crosslinking density cannot be increased by adding of ZnO. Mooney viscosity ($ML_{(1+4)}(100°$ C.$)$) of 746 SXL is large as 151 and 181 by two lots measurement, on the contrary in the case of Nipol 550 is small as 94, therefore, in case of Nipol 550 it is considered that effect of enmeshing or mutual invading are becoming small because molecular chain is small.

EXAMPLE 14

Electric properties of the glove of the present invention are measured.
(a) Surface Resistivity
Measuring method is mentioned as follows. Measuring apparatus is shown in FIG. 12.
Based on IEC standard 61340-2-1A. 5.4.
Environment for measurement: 20° C., 40% RH
Testing apparatus: Surface resistance meter MODEL 152 (product of Treck)
Charged electric voltage: 100 v
Measuring result is $2.65 \times 10^{12}$ Ω/sq.
(b) Resistance at Gloves Wearing
Measuring method is mentioned below. Measuring apparatus is shown in FIG. 13.
Based on IEC standard 61340-2-1A.5.4.
Environment for measurement: 20° C., 40% RH
Testing apparatus: Surface resistance meter MODEL 152 (product of Treck)
Charged electric voltage: 100 v
Normalized value: $7.5 \times 10^5 \leq Rg \leq 1 \times 10^{12}$
Measuring result is $1.22 \times 10^8$ Ω.

(c) Measurement of Charge Decay
Method for measurement is mentioned below. Measuring apparatus is shown in FIG. 14.
Based on ICE standard 61340-2-1 Appendix A, A2.2.
Environment for measurement: 20° C., 40% RH
Used apparatus: Charged plate monitor MODEL 158 charge (product of Treck)
Normalized value: less than 2 seconds
A hand of monitor wearing the gloves which is set up by list strap on a plate which is charged to ±1000 v, and measure the time until the plate decays to ±100 v.

According to the results, the time necessary to decay from 1000 v to 100 v is 0.48 seconds by − polarity and 0.35 seconds by + polarity.

As mentioned above, the gloves of the present invention indicates good electric properties.

[Applicability for Industrial Use]

According to the present invention, elastomer which does not cause delayed IVtype hypersensitivity can be provided. Further, application of crosslinking method indicated in the present invention can be considered.

The invention claimed is:

1. An elastomer composition comprising an emulsion which comprises 25-30 weight % of acrylonitrile, 62-71 weight % of butadiene, and 4-8 weight % of unsaturated carboxylic acid (total 100 weight %), wherein:
   (i) the unsaturated carboxylic acid comprises a first fraction of substituents and a second fraction of substituents, the second fraction being residual with respect to the first fraction, the first fraction of substituents forming cross-links via bonds with each other, the second fraction of substituents being unreacted;
   (ii) the elastomer composition, so cross-linked, has a Mooney viscosity ($ML_{(1+4)}(100°C.)$) of 100-220 and a film weight swelling ratio of 200-400%; and
   (iii) the elastomer composition does not contain sulfur cross-linking agents or sulfur vulcanization accelerators.

2. The elastomer composition of claim 1, wherein said 25-30 weight % of acrylonitrile, 62-71 weight % of butadiene, and 4-8 weight % of unsaturated carboxylic acid (total 100 weight %) is obtained by addition of unsaturated carboxylic acid to acrylonitrile-butadiene which possesses unsaturated carboxylic acid or does not possess unsaturated carboxylic acid.

3. The elastomer composition of claim 1, wherein an end group of the first fraction of substituents is at least one selected from the group consisting of carboxylic group, methylolamide group, reacted product of carboxylic group and diamine, and reacted product of carboxylic group and alkyl alcohol, and is bonded through a part of said end group with an end group of another acrylonitrile-butadiene elastomer unsaturated carboxylic acid.

4. An elastomer composition comprising 25-30 weight % of acrylonitrile, 62-71% of butadiene, and 4-8 weight % of unsaturated carboxylic acid (total 100 weight %), wherein;
   (i) the unsaturated carboxylic acid comprises a first fraction of substituents and a second fraction of substituents, the second fraction being residual with respect to the first fraction, the first fraction of substituents comprising covalent bonds formed via bonds with each other, the second fraction of substituents forming cross-links via ionic bonds with a bivalent metallic ion;
   (ii) the elastomer composition so covalently bonded and cross-linked has a film weight swelling ratio of 200-400%; and (iii) the elastomer composition does not contain sulfur cross-linking agents or sulfur vulcanization accelerators.

5. The elastomer composition of claim 4, wherein the bivalent metallic ion is at least one selected from a group consisting of zinc ion, magnesium ion, and barium ion.

6. The elastomer composition of claim 4, wherein the bivalent metallic ion is zinc ion.

7. The elastomer composition of claim 4, wherein the 25-30 weight % of acrylonitrile, 62-71 weight % of butadiene, and 4-8 weight % of unsaturated carboxylic acid (total 100 weight %) of the elastomer composition of claim 4 is obtained by addition of unsaturated carboxylic acid to acrylonitrile-butadiene which possesses unsaturated carboxylic acid or does not possess unsaturated carboxylic acid.

8. The elastomer composition of claim 4, wherein an end group of the first fraction of substituents is at least one selected from the group consisting of carboxylic group, methylolamide group, reacted product of carboxylic group and diamine, and reacted product of carboxylic group and alkyl alcohol, and is bonded through a part of said end group with an end group of another acrylonitrile-butadiene elastomer unsaturated carboxylic acid.

9. An elastomer composition comprising:
(i) 100 parts per hundred rubber (phr) of an emulsion composition which comprises 25-30 weight % of acrylonitrile, 62-71 weight % of butadiene and 4-8 weight % of unsaturated carboxylic acid (total 100 weight %), wherein the unsaturated carboxylic acid comprises a first fraction of substituents and a second fraction of substituents, the second fraction being residual with respect to the first fraction, the first fraction of substituents forming cross-links via bonds with each other, the second fraction of substituents being unreacted, and the emulsion composition has a Mooney viscosity ($ML_{1+4}$ (100° C.)) of 100-220 and a film weight swelling ratio of 200-400%;
(ii) 0.5-4.0 phr of a crosslinking agent consisting of a bivalent metallic oxide,
(iii) 0.1-2.0 phr of a pH adjusting agent to adjust pH to 9-10,
(iv) 0.5-2.0 phr of a dispersing agent,
(v) and water, the water having been added by an amount to obtain a concentration of total solid compound (TSC) of 18-30 weight %,
wherein:
(a) the cross-links of the first fraction of substituents are covalent bonds;
(b) the second fraction of substituents forms cross-links via ionic bonds with the bivalent metallic ion;
(c) the elastomer composition so cross-linked has a film weight swelling ratio of 200-400%; and
(d) the elastomer composition does not contain sulfur cross-linking agents or sulfur vulcanization accelerators.

10. The elastomer composition of claim 9, wherein the pH adjusting agent is potassium hydroxide.

11. The elastomer composition of claim 9, further comprising titanium dioxide as a coloring agent.

12. The elastomer composition of claim 9, further comprising polymeric hindered phenol as an anti oxidant.

13. The elastomer composition of claim 9, wherein the dispersing agent is an anionic surfactant.

14. The elastomer composition of claim 13, wherein the anionic surfactant is sodium alkylbenzene sulfonate.

15. A glove formed from an elastomer comprising 25-30 weight % of acrylonitrile, 62-71 weight % of butadiene, and 4-8 weight % of unsaturated carboxylic acid (total 100 weight %), wherein:
(i) the unsaturated carboxylic acid comprises a first fraction of substituents and a second fraction of substituents, the second fraction being residual with respect to the first fraction, the first fraction of substituents forming cross-links via bonds with each other, the second fraction of substituents forming cross-links via ionic bonds with a bivalent metallic ion;
(ii) the elastomer does not contain sulfur cross-linking agents or sulfur vulcanization accelerators;
(iii) the elastomer had a Mooney viscosity ($ML_{(1+4)}$ (100° C.)) of 100-220 after formation of the cross-links of the first fraction of substituents and before formation of the cross-links of the second fraction of substituents;
(iv) the glove has been prepared from the elastomer without use of sulfur cross-linking agents or sulfur vulcanization accelerators; and
(v) the glove has a thickness of 0.05-0.15 mm, a glove swelling ratio at formation of 240-320, a tensile stress of 22-35 MPa, an elongation to break of 480-620%, and a tensile stress at 500% elongation of 15-35 MPa.

16. A glove formed from an elastomer comprising 25-30 weight % of acrylonitrile, 62-71 weight % of butadiene, and 4-8 weight % of unsaturated carboxylic acid (total 100 weight %), wherein:
(i) the unsaturated carboxylic acid comprises a first fraction of substituents and a second fraction of substituents, the second fraction being residual with respect to the first fraction, the first fraction of substituents forming cross-links via bonds with each other, the second fraction of substituents forming cross-links via ionic bonds with a bivalent metallic ion;
(ii) the elastomer does not contain sulfur cross-linking agents or sulfur vulcanization accelerators;
(iii) the elastomer had a Mooney viscosity ($ML_{1+4}$ (100° C.)) of 100-220 after formation of the cross-links of the first fraction of substituents and before formation of the cross-links of the second fraction of substituents;
(iv) the glove has been prepared from the elastomer without use of sulfur cross-linking agents or sulfur vulcanization accelerators; and
(v) the glove has a thickness of 0.05-0.15 mm, a glove swelling ratio at formation of 240-320, a tensile stress of 22-35 MPa, an elongation to break of 480-620%, and a tensile stress at 500% elongation of 15-35 MPa;
the glove having been prepared by processes of:
(a) a process to wash a mold or a former by washing with water and allowing to dry,
(b) a process to dip the mold or the former into a solution of a coagulant,
(c) a process to dry the mold or the former to which the coagulant is stuck,
(d) a process to dip the mold or the former to which the coagulant is stuck and dried into the elastomer for 1-20 seconds at 30° C.,
(e) a process to dry the mold or the former obtained in (d) process at 80-120° C, and
(f) a process to crosslink and harden the elastomer on the mold or the former obtained in (e) process by treatment at 120-150° C. for 20-30 minutes.

* * * * *